US012720184B2

(12) United States Patent
Sato

(10) Patent No.: US 12,720,184 B2
(45) Date of Patent: Aug. 25, 2026

(54) IMAGING CONTROL APPARATUS, IMAGING CONTROL METHOD, AND STORAGE MEDIUM

(71) Applicant: CANON KABUSHIKI KAISHA, Tokyo (JP)

(72) Inventor: Koyo Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/810,357

(22) Filed: Aug. 20, 2024

(65) Prior Publication Data

US 2025/0080827 A1 Mar. 6, 2025

(30) Foreign Application Priority Data

May 14, 2024 (JP) ................................ 2024-078674

(51) Int. Cl.

*H04N 23/611* (2023.01)
*H04N 23/69* (2023.01)
*H04N 23/695* (2023.01)
*H04N 23/62* (2023.01)

(52) U.S. Cl.

CPC ........... *H04N 23/611* (2023.01); *H04N 23/69* (2023.01); *H04N 23/695* (2023.01); *H04N 23/62* (2023.01)

(58) Field of Classification Search

CPC .... H04N 23/611; H04N 23/69; H04N 23/695; H04N 23/62

See application file for complete search history.

(56) References Cited

U.S. PATENT DOCUMENTS

| | | | | |
|---|---|---|---|---|
| 2006/0195199 | A1* | 8/2006 | Iwasaki | G08B 21/0476 700/1 |
| 2007/0052803 | A1* | 3/2007 | Chosak | G08B 13/1968 348/E7.086 |
| 2018/0017847 | A1* | 1/2018 | Tamaru | H04N 25/61 |
| 2018/0160025 | A1* | 6/2018 | Pallanti | G01S 3/7864 |
| 2018/0247421 | A1* | 8/2018 | DeAngelis | H04N 23/695 |
| 2020/0151441 | A1* | 5/2020 | Doumbouya | G06T 7/215 |
| 2024/0422289 | A1* | 12/2024 | Ostap | H04N 7/147 |

FOREIGN PATENT DOCUMENTS

| | | | |
|---|---|---|---|
| CN | 115988309 A | * | 4/2023 |
| JP | 2012029338 A | | 2/2012 |
| JP | 2019029886 A | | 2/2019 |

* cited by examiner

*Primary Examiner* — Shadan E Haghani
(74) *Attorney, Agent, or Firm* — Canon U.S.A., Inc. IP Division

(57) ABSTRACT

An imaging control apparatus that controls an imaging apparatus that includes and drives a pan drive unit, a tilt drive unit, and a lens drive unit, the imaging control apparatus includes a detection unit configured to detect a subject from a captured image, a distance acquisition unit configured to acquire at least one distance between the detected subject and a plurality of other subjects, and a control unit configured to switch between a first control over the imaging apparatus capturing an image and a second control different from the first control over the imaging apparatus capturing an image based on the acquired distance between the subjects, wherein the first control tracks the subject in images being captured by the imaging apparatus, and wherein the second control sets a composition of the images being captured by the imaging apparatus to a predetermined composition.

19 Claims, 15 Drawing Sheets

100
101
CPU
102
RAM
103
ROM
104
VIDEO OUTPUT I/F
110
DRIVE UNIT
DRIVE I/F
IMAGE SENSOR
IMAGE PROCESSING UNIT
NETWORK I/F
109
108
107
106
105
200
208
VIDEO INPUT I/F
201
CPU
202
RAM
203
ROM
209
INFERENCE UNIT
USER INPUT I/F
VIDEO OUTPUT I/F
NETWORK I/F
207
206
205
204
400
300
301
CPU
302
RAM
303
SSD
308
DEVICE I/F
OPERATION UNIT
DISPLAY UNIT
NETWORK I/F
307
306
305
304

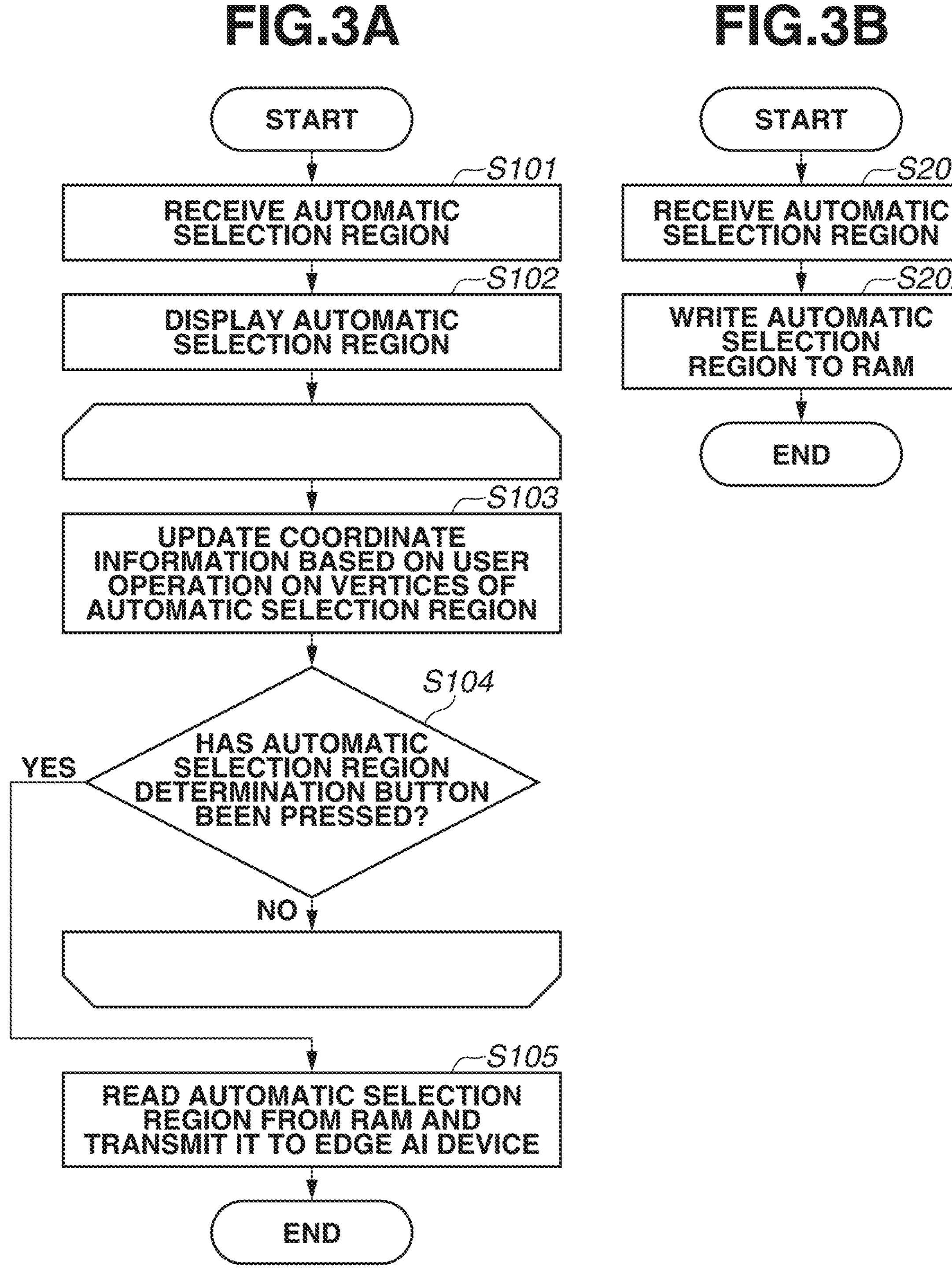
FIG.3A
START
S101
RECEIVE AUTOMATIC SELECTION REGION
S102
DISPLAY AUTOMATIC SELECTION REGION
S103
UPDATE COORDINATE INFORMATION BASED ON USER OPERATION ON VERTICES OF AUTOMATIC SELECTION REGION
S104
HAS AUTOMATIC SELECTION REGION DETERMINATION BUTTON BEEN PRESSED?
YES
NO
S105
READ AUTOMATIC SELECTION REGION FROM RAM AND TRANSMIT IT TO EDGE AI DEVICE
END
FIG.3B
START
S201
RECEIVE AUTOMATIC SELECTION REGION
S202
WRITE AUTOMATIC SELECTION REGION TO RAM
END

FIG.4

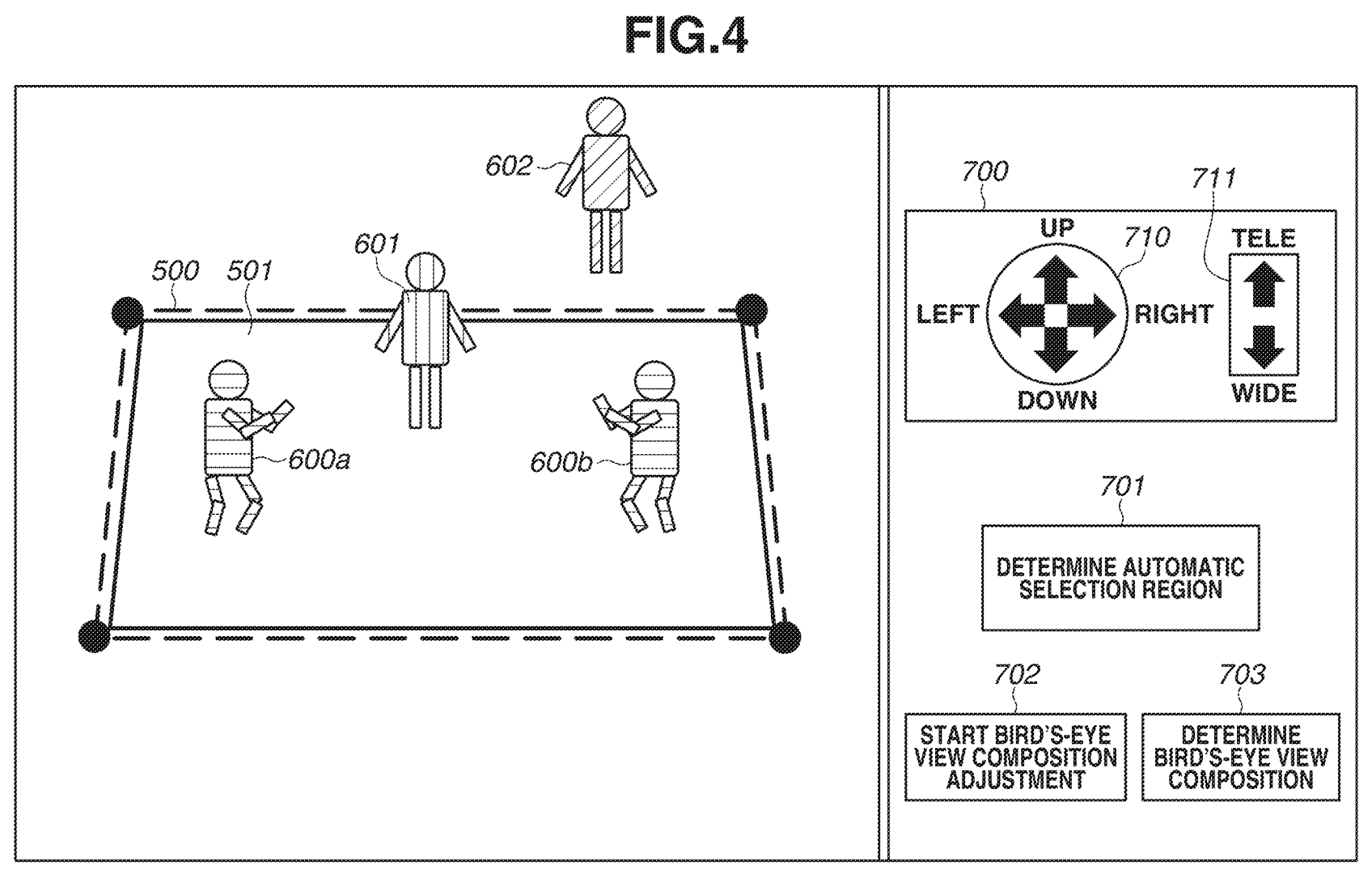

700
UP
RIGHT
LEFT
DOWN
710
711
TELE
WIDE
701
DETERMINE AUTOMATIC SELECTION REGION
702
START BIRD'S-EYE VIEW COMPOSITION ADJUSTMENT
703
DETERMINE BIRD'S-EYE VIEW COMPOSITION
500
501
600a
601
602
600b

FIG.5A
START
S301 RECEIVE COMMAND TO TRANSMIT PAN, TILT, AND ZOOM VALUES
S302 READ PAN, TILT, AND ZOOM VALUES FROM RAM
S303 TRANSMIT PAN, TILT, AND ZOOM VALUES TO PC
END
FIG.5B
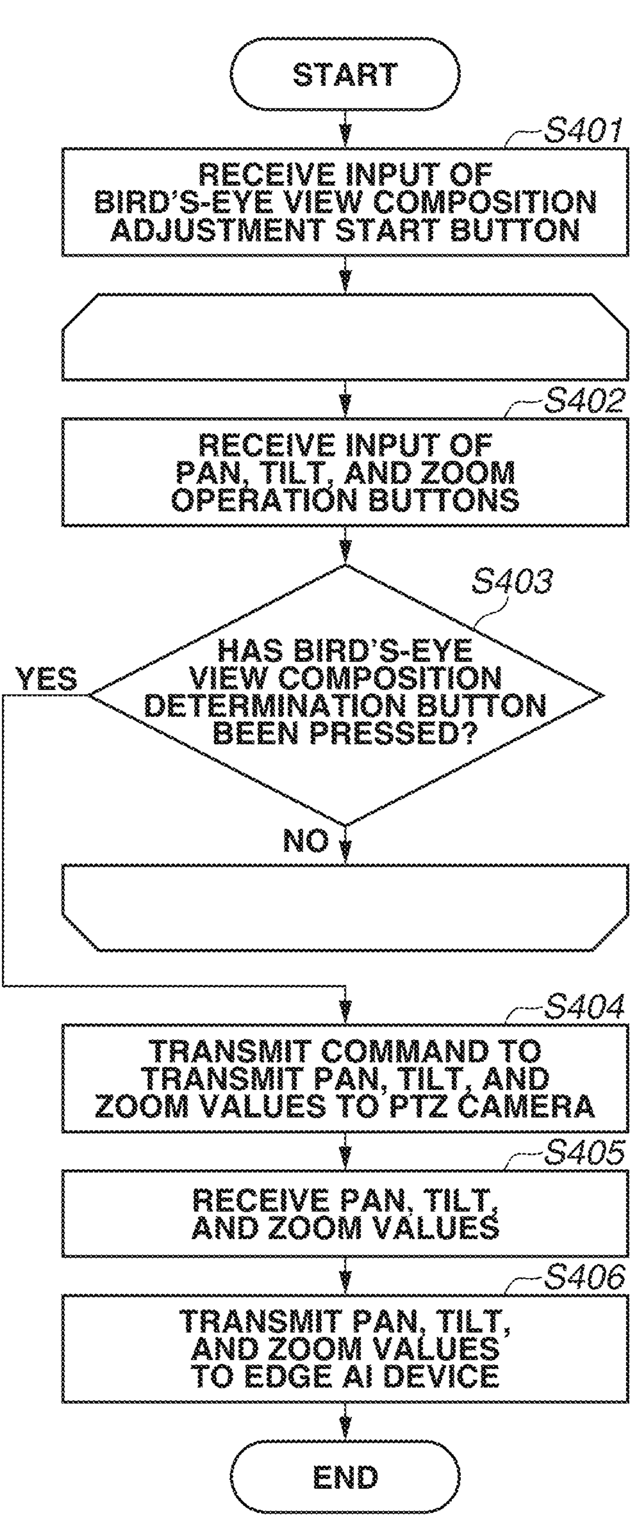
FIG.5C
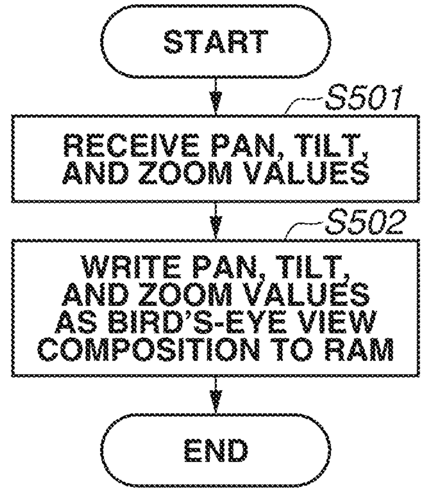

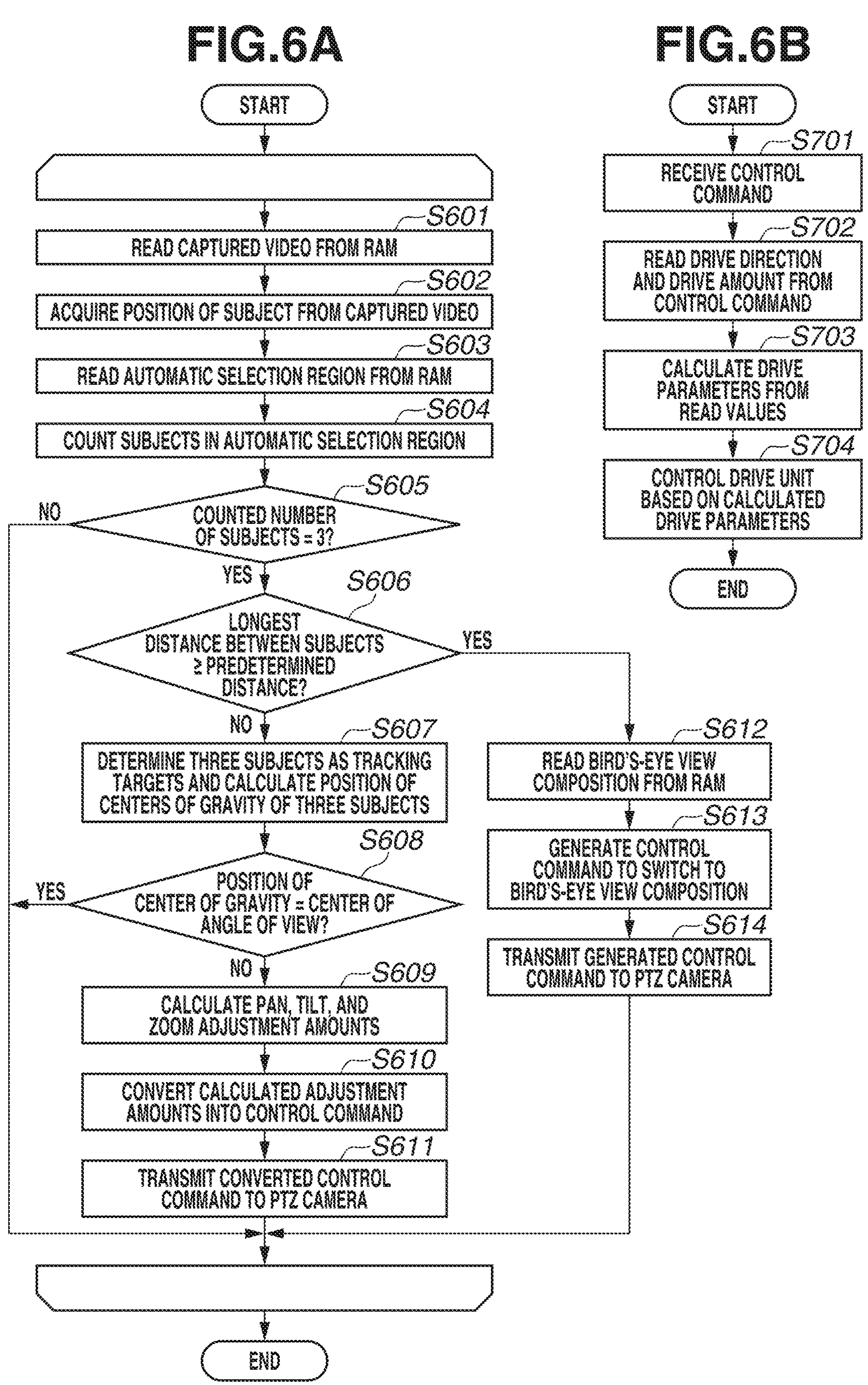
FIG.6A
START
S601
READ CAPTURED VIDEO FROM RAM
S602
ACQUIRE POSITION OF SUBJECT FROM CAPTURED VIDEO
S603
READ AUTOMATIC SELECTION REGION FROM RAM
S604
COUNT SUBJECTS IN AUTOMATIC SELECTION REGION
S605
COUNTED NUMBER OF SUBJECTS ≥ 3?
NO
YES
S606
LONGEST DISTANCE BETWEEN SUBJECTS ≥ PREDETERMINED DISTANCE?
YES
NO
S607
DETERMINE THREE SUBJECTS AS TRACKING TARGETS AND CALCULATE POSITION OF CENTERS OF GRAVITY OF THREE SUBJECTS
S608
POSITION OF CENTER OF GRAVITY = CENTER OF ANGLE OF VIEW?
YES
NO
S609
CALCULATE PAN, TILT, AND ZOOM ADJUSTMENT AMOUNTS
S610
CONVERT CALCULATED ADJUSTMENT AMOUNTS INTO CONTROL COMMAND
S611
TRANSMIT CONVERTED CONTROL COMMAND TO PTZ CAMERA
S612
READ BIRD'S-EYE VIEW COMPOSITION FROM RAM
S613
GENERATE CONTROL COMMAND TO SWITCH TO BIRD'S-EYE VIEW COMPOSITION
S614
TRANSMIT GENERATED CONTROL COMMAND TO PTZ CAMERA
END
FIG.6B
START
S701
RECEIVE CONTROL COMMAND
S702
READ DRIVE DIRECTION AND DRIVE AMOUNT FROM CONTROL COMMAND
S703
CALCULATE DRIVE PARAMETERS FROM READ VALUES
S704
CONTROL DRIVE UNIT BASED ON CALCULATED DRIVE PARAMETERS
END

FIG.10

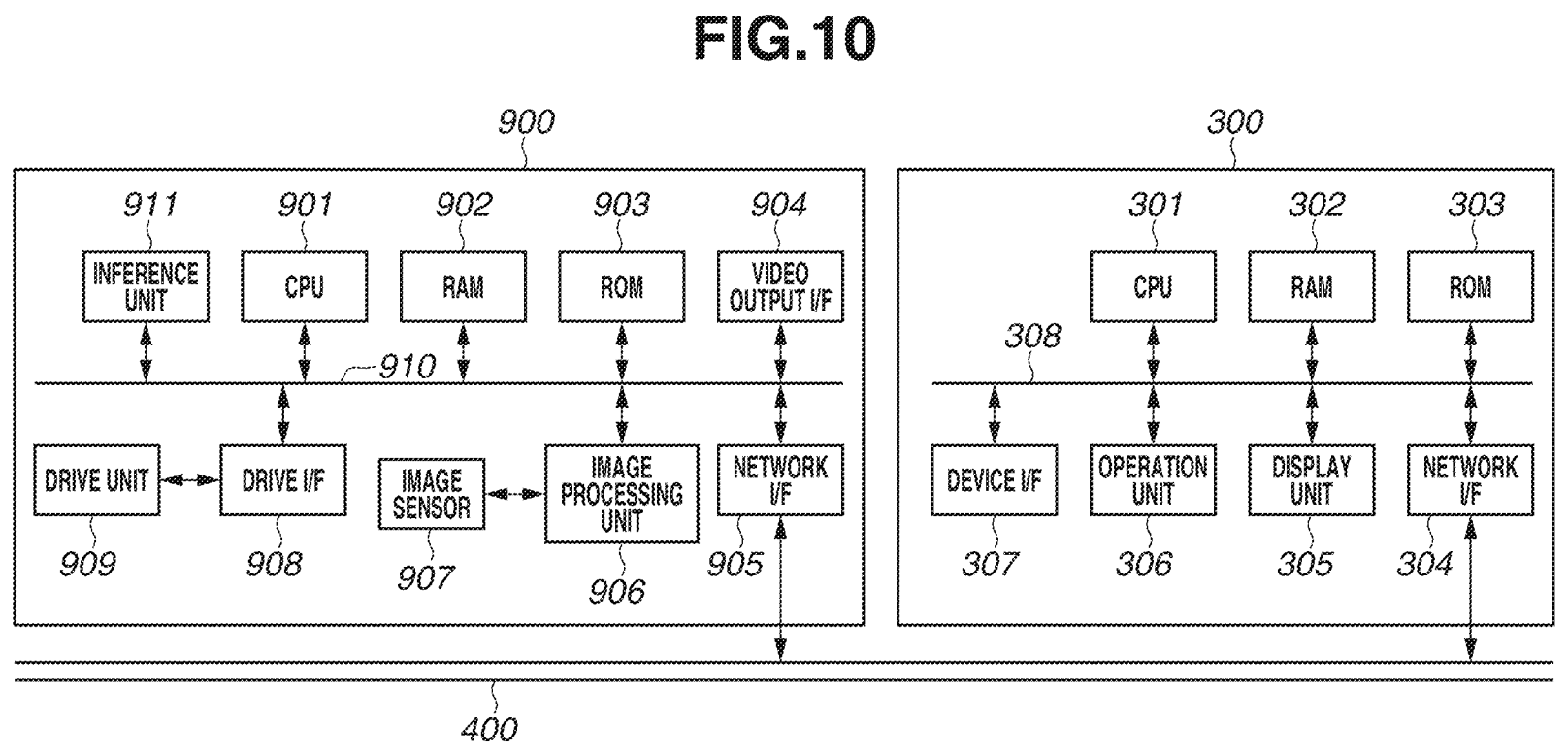

300
301 CPU
302 RAM
303 ROM
304 NETWORK I/F
305 DISPLAY UNIT
306 OPERATION UNIT
307 DEVICE I/F
308

900
901 CPU
902 RAM
903 ROM
904 VIDEO OUTPUT I/F
905 NETWORK I/F
906 IMAGE PROCESSING UNIT
907 IMAGE SENSOR
908 DRIVE I/F
909 DRIVE UNIT
910
911 INFERENCE UNIT

400

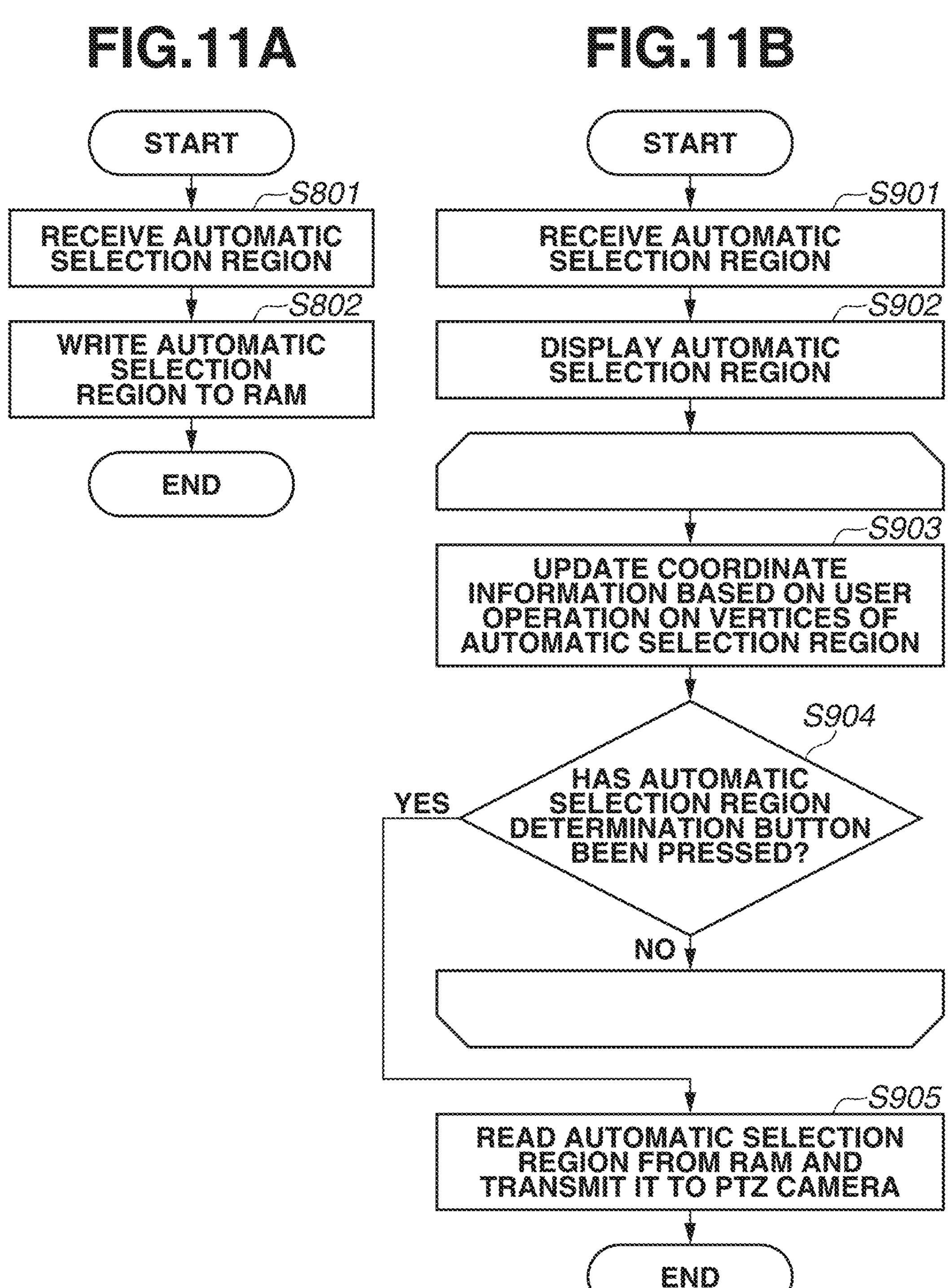
FIG.11A
START
S801
RECEIVE AUTOMATIC SELECTION REGION
S802
WRITE AUTOMATIC SELECTION REGION TO RAM
END
FIG.11B
START
S901
RECEIVE AUTOMATIC SELECTION REGION
S902
DISPLAY AUTOMATIC SELECTION REGION
S903
UPDATE COORDINATE INFORMATION BASED ON USER OPERATION ON VERTICES OF AUTOMATIC SELECTION REGION
S904
HAS AUTOMATIC SELECTION REGION DETERMINATION BUTTON BEEN PRESSED?
YES
NO
S905
READ AUTOMATIC SELECTION REGION FROM RAM AND TRANSMIT IT TO PTZ CAMERA
END

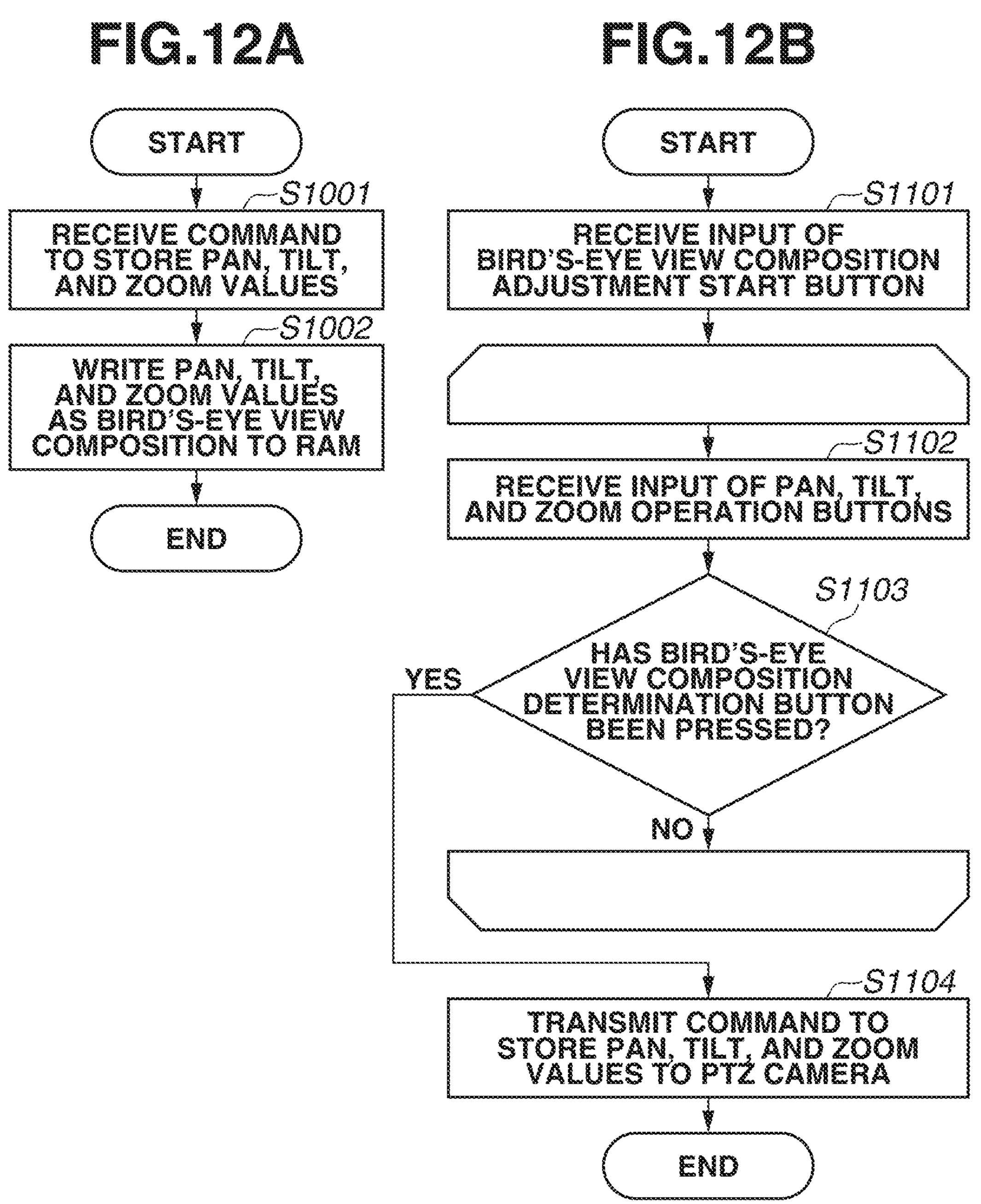
FIG.12A
START
S1001
RECEIVE COMMAND TO STORE PAN, TILT, AND ZOOM VALUES
S1002
WRITE PAN, TILT, AND ZOOM VALUES AS BIRD'S-EYE VIEW COMPOSITION TO RAM
END
FIG.12B
START
S1101
RECEIVE INPUT OF BIRD'S-EYE VIEW COMPOSITION ADJUSTMENT START BUTTON
S1102
RECEIVE INPUT OF PAN, TILT, AND ZOOM OPERATION BUTTONS
S1103
HAS BIRD'S-EYE VIEW COMPOSITION DETERMINATION BUTTON BEEN PRESSED?
YES
NO
S1104
TRANSMIT COMMAND TO STORE PAN, TILT, AND ZOOM VALUES TO PTZ CAMERA
END

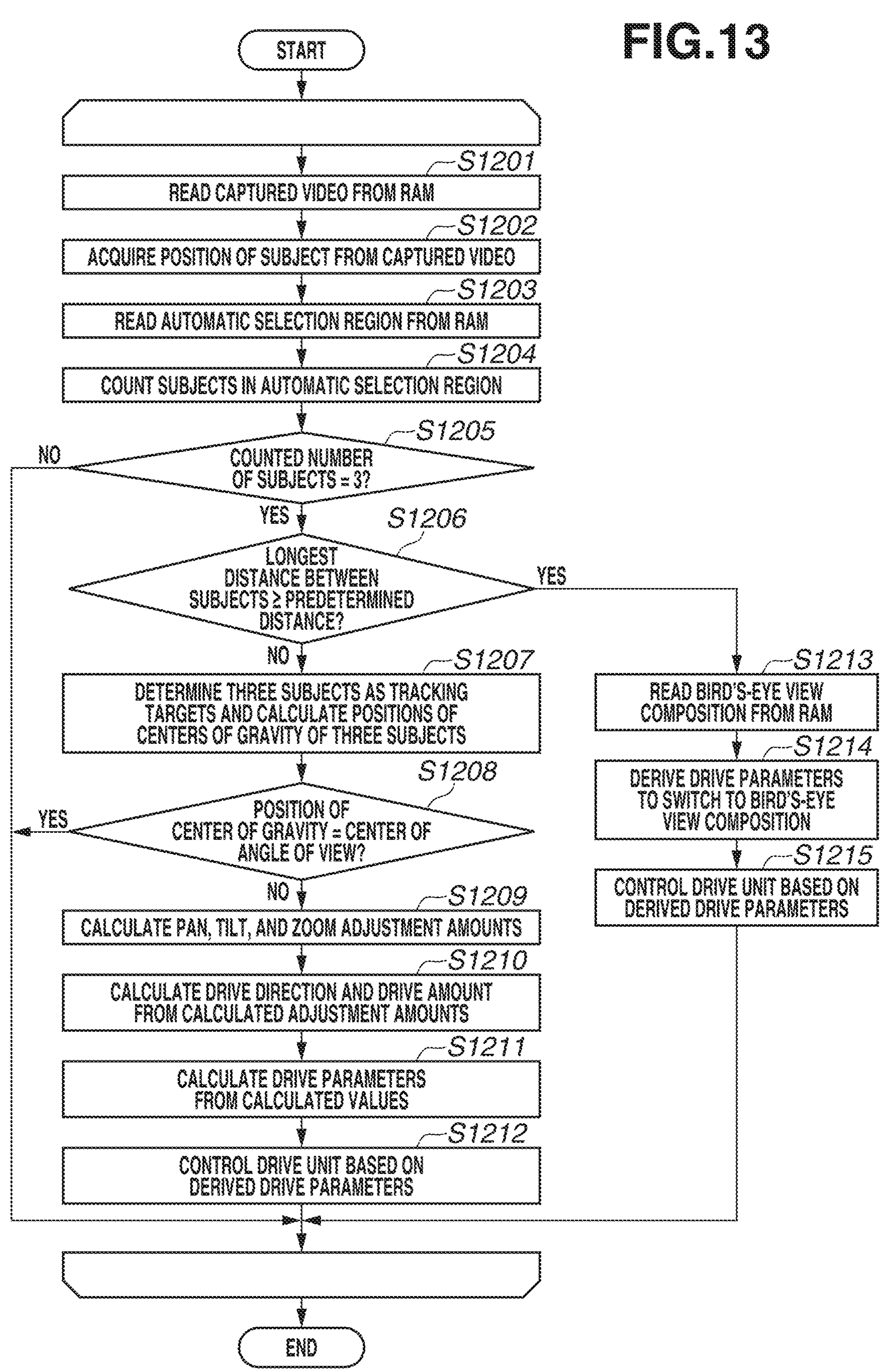
FIG.13
START
S1201
READ CAPTURED VIDEO FROM RAM
S1202
ACQUIRE POSITION OF SUBJECT FROM CAPTURED VIDEO
S1203
READ AUTOMATIC SELECTION REGION FROM RAM
S1204
COUNT SUBJECTS IN AUTOMATIC SELECTION REGION
S1205
COUNTED NUMBER OF SUBJECTS = 3?
NO
YES
S1206
LONGEST DISTANCE BETWEEN SUBJECTS ≥ PREDETERMINED DISTANCE?
YES
NO
S1207
DETERMINE THREE SUBJECTS AS TRACKING TARGETS AND CALCULATE POSITIONS OF CENTERS OF GRAVITY OF THREE SUBJECTS
S1208
POSITION OF CENTER OF GRAVITY = CENTER OF ANGLE OF VIEW?
YES
NO
S1209
CALCULATE PAN, TILT, AND ZOOM ADJUSTMENT AMOUNTS
S1210
CALCULATE DRIVE DIRECTION AND DRIVE AMOUNT FROM CALCULATED ADJUSTMENT AMOUNTS
S1211
CALCULATE DRIVE PARAMETERS FROM CALCULATED VALUES
S1212
CONTROL DRIVE UNIT BASED ON DERIVED DRIVE PARAMETERS
S1213
READ BIRD'S-EYE VIEW COMPOSITION FROM RAM
S1214
DERIVE DRIVE PARAMETERS TO SWITCH TO BIRD'S-EYE VIEW COMPOSITION
S1215
CONTROL DRIVE UNIT BASED ON DERIVED DRIVE PARAMETERS
END

IMAGING CONTROL APPARATUS, IMAGING CONTROL METHOD, AND STORAGE MEDIUM

BACKGROUND

Field

The present disclosure relates to a technology for controlling an imaging apparatus.

Description of the Related Art

Automatic imaging and production methods in which an edge artificial intelligence (edge AI) device controls an imaging apparatus capable of adjusting its imaging direction (pan and tilt directions) and an angle of view (zoom value) have been increasingly used. An imaging apparatus with a pan, tilt, and zoom adjustable function will be referred to as a pan-tilt-zoom (PTZ) camera. An example of a known method for automatically controlling a PTZ camera is utilization of artificial intelligence (AI) with which desired subjects are detected in a captured video and the PTZ camera is controlled to track the subjects. With further application of the AI technology, an imaging direction of the PTZ camera is selected in accordance with a positional relationship between the plurality of detected subjects, whereby automatic control of the PTZ camera is achieved in such a manner that not only a single subject but also a plurality of subjects is fit within the angle of view.

Japanese Patent Application Laid-Open No. 2019-29886 discusses a technique in which a moving object group including a plurality of moving objects within a predetermined region is fit within an imaging angle of view of a movable camera with an up, down, left, and right movement adjustable function. This technique facilitates image capturing of a match or a competition including a plurality of players and a referee, such as judo or boxing, so that the plurality of players and the referee are fit within the imaging angle of view. Specifically, the imaging direction of the PTZ camera can be controlled to fit the plurality of players and the referee within the imaging angle of view of the PTZ camera, which leads to the achievement of automated image capturing.

Meanwhile, immersive imaging is achieved by switching as needed between a close-up image composition of players and a wide-angle image composition of the entire venue. However, even with the PTZ camera, a camera operator is still required to perform operations to switch between the image compositions and to change the camera work associated with the switching of image composition.

SUMMARY OF THE INVENTION

The present disclosure is directed to reducing inconvenience to operators.

According to an aspect of the present disclosure, an imaging control apparatus that controls an imaging apparatus that includes and drives a pan drive unit, a tilt drive unit, and a lens drive unit, the imaging control apparatus including one or more memories storing computer executable instructions, and one or more processors that, upon execution of the stored instructions, is configured to operate as a detection unit configured to detect a subject from a captured image, a distance acquisition unit configured to acquire at least one distance between the detected subject and a plurality of other subjects, and a control unit configured to switch between a first control over the imaging apparatus capturing an image and a second control different from the first control over the imaging apparatus capturing an image based on the acquired distance between the subjects, wherein the first control tracks the subject in images being captured by the imaging apparatus, and wherein the second control sets a composition of the images being captured by the imaging apparatus to a predetermined composition.

Further features of the present disclosure will become apparent from the following description of exemplary embodiments with reference to the attached drawings.

BRIEF DESCRIPTION OF THE DRAWINGS

FIG. 3A is a flowchart illustrating an automatic selection region setting up operation in the first exemplary embodiment that is performed by a personal computer (PC). FIG. 3B is a flowchart illustrating an automatic selection region setting up operation in the first exemplary embodiment that is performed by an edge artificial intelligence (edge AI) device.

FIG. 4 is a diagram illustrating an example of a user interface (UI) for imaging-related various settings.

FIG. 5A is a flowchart illustrating a bird's-eye view composition setting up operation in the first exemplary embodiment that is performed by a pan-tilt-zoom (PTZ) camera. FIG. 5B is a flowchart illustrating a bird's-eye view composition setting up operation in the first exemplary embodiment that is performed by the PC. FIG. 5C is a flowchart illustrating a bird's-eye view composition setting up operation in the first exemplary embodiment that is performed by the edge AI device.

FIG. 6A is a flowchart illustrating a tracking operation in the first exemplary embodiment that is performed by the edge AI device. FIG. 6B is a flowchart illustrating a tracking operation in the first exemplary embodiment that is performed by the PTZ camera.

FIG. 10 is a diagram illustrating an example of internal configurations of apparatuses according to the second exemplary embodiment.

FIG. 11A is a flowchart illustrating an automatic selection region setting up operation of the PTZ camera according to the second exemplary embodiment. FIG. 11B is a flowchart illustrating an automatic selection region setting up operation of the PC according to the second exemplary embodiment.

FIG. 12A is a flowchart illustrating a bird's-eye view composition setting up operation of the PTZ camera according to the second exemplary embodiment. FIG. 12B is a flowchart illustrating a bird's-eye view composition setting up operation of the PC according to the second exemplary embodiment.

FIG. 13 is a flowchart illustrating a tracking operation in the second exemplary embodiment.

DESCRIPTION OF THE EMBODIMENTS

Figure 1:
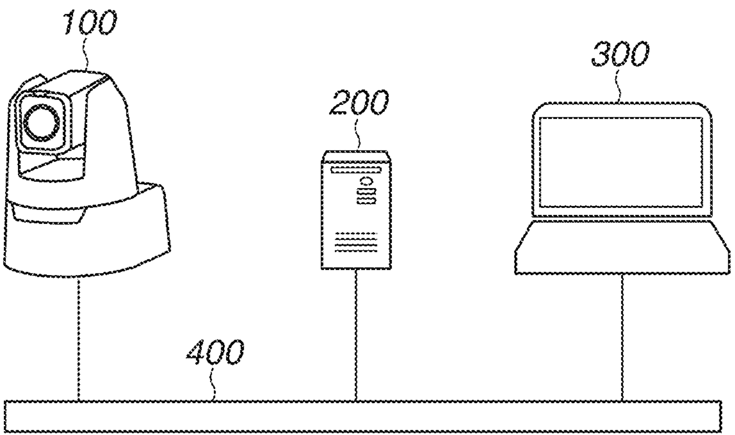
FIG. 1 is a diagram illustrating an example of a configuration of an imaging system according to a first exemplary embodiment.

Exemplary embodiments of the present disclosure will be described below with reference to the drawings. The following exemplary embodiments are not intended to limit the present disclosure, and not all combinations of features described in the exemplary embodiments are essential to the solution of the present disclosure. The configuration of the exemplary embodiments can be appropriately modified or changed according to the specifications of the apparatus to which the present disclosure is applied and various conditions (use conditions, use environment, etc.).

In the following exemplary embodiments, the same or similar components and processing steps are denoted by the same reference numerals, and the redundant descriptions are omitted.

Imaging System

In a first exemplary embodiment, an imaging system including an imaging apparatus (pan-tilt-zoom (PTZ) camera) capable of adjusting its imaging direction (pan and tilt directions) and angle of view (zoom value), an edge artificial intelligence (edge AI) device, and a personal computer (PC) will be described below as an example. The first exemplary embodiment is an example in which the edge AI device plays the role of an imaging control apparatus for controlling the PTZ camera. In the first exemplary embodiment, the edge AI device detects target subjects from images captured by the PTZ camera and controls the imaging direction and the angle of view of the PTZ camera to track the subjects automatically. While two players in a match and one referee will be described below as three detection target subjects as an example in examples according to exemplary embodiments described below, the number of detection target subjects is not limited to three.

FIG. 1 is a diagram illustrating an example of a schematic configuration of an imaging system according to the first exemplary embodiment. As illustrated in FIG. 1, the imaging system according to the present exemplary embodiment is a system in which a pan-tilt-zoom (PTZ) camera 100, an edge AI device 200, and a personal computer (PC) 300 are connected to each other via a network 400. The network 400 is, for example, a local area network (LAN) or may be another network and may include video cables.

The PTZ camera 100 includes an imaging optical system, an image sensor, and an image processing unit. The PTZ camera 100 transmits an image (referred to as "captured video"), which has been captured by the image sensor and processed by the image processing unit, to the edge AI device 200 and the PC 300 via the network 400. The PTZ camera 100 further includes a drive unit for pan-tilt-zoom driving. The drive unit rotates the PTZ camera 100 in pan and tilt directions to change an imaging direction (pan and tilt directions). Further, the drive unit changes a zoom value of the imaging optical system to change an angle of view. Details of a configuration, functions, and operations of the PTZ camera 100 according to the present exemplary embodiment will be described below.

The PC 300 transmits information for imaging-related various settings to the edge AI device 200 and displays captured videos received from the PTZ camera 100. The imaging-related various settings include general imaging settings in PTZ cameras and settings related to a predetermined target region and a predetermined composition in the present exemplary embodiment described below. The PC 300 generates imaging-related various settings information based on inputs from a user (e.g., operator) and transmits the imaging-related various settings information to the edge AI device 200. Details of a configuration, functions, and operations of the PC 300 according to the present exemplary embodiment will be described below.

The edge AI device 200 performs inference using AI on the captured video received from the PTZ camera 100 and detects a subject. The edge AI device 200 calculates an imaging direction and an angle of view of the PTZ camera 100 to track the subject detected by inference, based on the detected subject and the imaging-related various settings that have been received from the PC 300. In the first exemplary embodiment, the edge AI device 200 has functions to serve as an imaging control apparatus, generates control signals to control the imaging direction and the angle of view of the PTZ camera 100, and transmits the control signals to the PTZ camera 100 via the network 400. Based on the control signals received from the edge AI device 200, the PTZ camera 100 performs pan and tilt operations and zoom operations. The edge AI device 200 according to the present exemplary embodiment controls automatic subject tracking and imaging of the PTZ camera 100 and performs automatic switching of an image composition and a camera work based on the imaging-related various settings information. Details thereof will be described below. Details of a configuration, functions, and operations of the edge AI device 200 according to the present exemplary embodiment will be described below.

In the imaging system according to the present exemplary embodiment, the PC 300 accesses a web server in the edge AI device 200, based on inputs from the user, and transmits the imaging-related various settings information to the edge AI device 200, based on inputs from the user. Then, the edge AI device 200 controls the PTZ camera 100 to cause the PTZ camera 100 to perform tracking of the subjects and switches to a predetermined composition described below. There are various methods for setting the imaging-related various settings, and examples include, but are not limited to, accessing the web server in the edge AI device 200 and activating an application program in the PC 300.

<Internal Configurations of Apparatuses in Imaging System>

Figure 2:
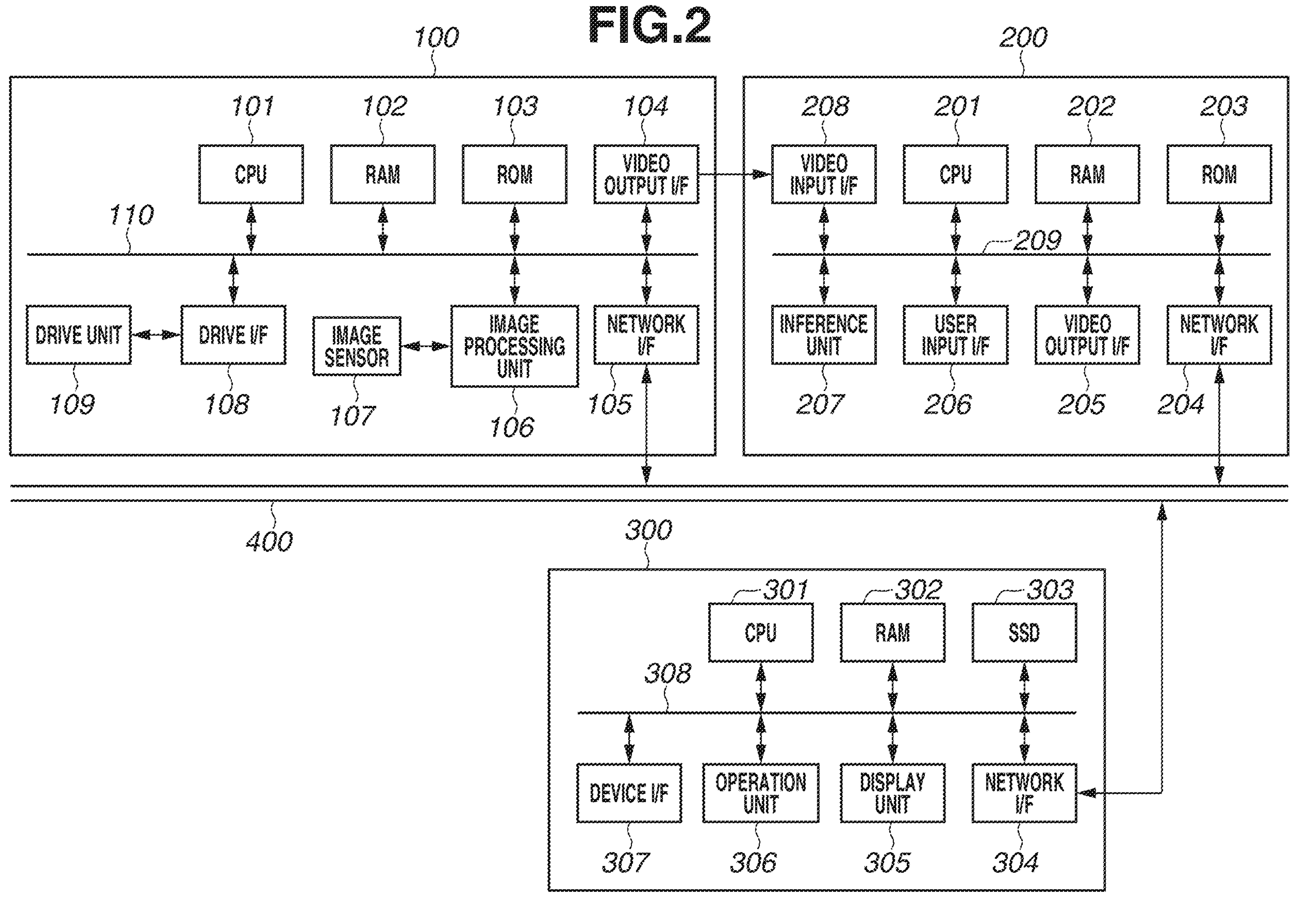
FIG. 2 is a diagram illustrating an example of internal configurations of apparatuses according to the first exemplary embodiment.

FIG. 2 is a diagram illustrating an example of internal configurations of the PTZ camera 100, the edge AI device 200, and the PC 300 in the imaging system illustrated in FIG. 1.

An internal configuration of the PTZ camera 100 will be described below.

The PTZ camera 100 includes a central processing unit (CPU) 101, a random access memory (RAM) 102, a read-only memory (ROM) 103, a video output interface (video output I/F) 104, a network interface (network I/F) 105, an image processing unit 106, an image sensor 107, a drive interface (drive I/F) 108, a drive unit 109, and an internal bus 110. The CPU 101, the RAM 102, the ROM 103, the video output I/F 104, the network I/F 105, the image processing unit 106, and the drive I/F 108 are connected to the internal bus 110. The image sensor 107 is connected to the image processing unit 106, and the drive unit 109 is connected to the drive I/F 108.

The CPU 101 is a central processing unit that controls entire operation of the PTZ camera 100 and performs various calculations.

The ROM 103 is a non-volatile storage device, such as a flash memory, a hard disk drive (HDD), a solid state drive (SSD), or a Secure Digital (SD) card. The ROM 103 is used as a persistent storage area for an operating system (OS), various programs, and various types of data and is also used as a storage area for various types of short-term data.

The RAM 102 is a storage device, such as a dynamic RAM (DRAM), and the OS, the various programs, and the various types of data are loaded into the RAM 102 from the ROM 103. Further, the RAM 102 is also used as a work area of the OS and the various programs.

The CPU 101 realizes operations of the PTZ camera 100 described below by executing the programs loaded into the RAM 102 from the ROM 103.

The image sensor 107 includes an image sensor, such as a charge-coupled device (CCD) image sensor or a complementary metal-oxide-semiconductor (CMOS) image sensor. The image sensor 107 acquires image data obtained by capturing an optical image formed by the imaging optical system (not illustrated) and outputs the image data to the image processing unit 106.

The image processing unit 106 performs image processing on the image data input from the image sensor 107 to convert the image data into a predetermined format and, as needed, compress the image data and transfers the resulting image data to the RAM 102. The image processing by the image processing unit 106 includes image quality adjustment on the image data input from the image sensor 107 and cropping processing to cut off only a predetermined region in the image.

The video output I/F 104 is an interface (I/F) for externally outputting the captured video that has been acquired by the image sensor 107 and processed by the image processing unit 106.

The video output I/F 104 includes, for example, a serial digital interface (SDI) or a high-definition multimedia interface (HDMI®). In the present exemplary embodiment, the video output I/F 104 is connected to a video input interface (video input I/F) 208 of the edge AI device 200 described below.

The network I/F 105 is an interface for connecting to the network 400. The network I/F 105 performs communication with external apparatuses, such as the edge AI device 200 and the PC 300, via a communication path, such as Ethernet®.

While the edge AI device 200 performs camera control remotely on the PTZ camera 100 via the network I/F 105 according to the present exemplary embodiment, the remote camera control may be performed via a different I/F, such as a serial communication I/F (not illustrated).

The drive I/F 108 is a connection part with the drive unit 109 and performs communication to transmit control signals to the drive unit 109 and receive information from the drive unit 109.

The drive unit 109 includes a mechanical drive system and a motor of a drive source, which serve as a rotation mechanism for changing the imaging direction (pan and tilt directions) of the PTZ camera 100. The drive unit 109 further includes a lens drive system serving as a mechanism for focusing and changing the angle of view (zoom value) of the imaging optical system of the PTZ camera 100. The drive unit 109 drives the mechanical drive system and the motor of the drive source to move the imaging direction of the PTZ camera 100 in a horizontal direction (pan direction) and a vertical direction (tilt direction), based on the control signals received from the CPU 101 via the drive I/F 108. The drive unit 109 operates the lens drive system in the imaging optical system to perform zooming and focusing operations to change the angle of view optically, based on the control signals received from the CPU 101 via the drive I/F 108.

An internal configuration of the edge AI device 200 will be described below.

The edge AI device 200 includes a CPU 201, a RAM 202, a ROM 203, a network I/F 204, a video output I/F 205, a user input interface (user input I/F) 206, an inference unit 207, and the video input I/F 208, and the foregoing components are connected to each other via an internal bus 209.

The CPU 201 controls entire operation of the edge AI device 200 and performs various calculations.

The ROM 203 is a non-volatile storage device, such as a flash memory, a HDD, an SSD, or a SD card. The ROM 203 is used as a persistent storage area for an OS, various programs, and various types of data and is also used as a storage area for various types of short-term data.

The RAM 202 is a high-speed, rewritable storage device such as a DRAM, and the OS, the various programs, and the various types of data are loaded into the RAM 202 from the ROM 203. Further, the RAM 202 is also used as a work area of the OS and the various programs.

The CPU 201 realizes operations of the edge AI device 200 described below by executing the programs loaded into the RAM 202 from the ROM 203.

The network I/F 204 is an I/F for connecting to the network 400 and performs communication with external apparatuses, such as the PTZ camera 100 and the PC 300 via the network 400.

The video output I/F 205 is an interface for outputting setting information about the edge AI device 200 that is to be displayed in a user interface (UI) screen when the predetermined target region and the predetermined composition on the PC 300 are set as described below.

The user input I/F 206 is an interface for connecting to a mouse, a keyboard, and other input devices and includes a universal serial bus (USB).

The video input I/F 208 is an interface for receiving captured videos from the PTZ camera 100 and includes a serial digital interface (SDI) and a high-definition multimedia interface (HDMI).

The inference unit 207 determines whether the captured video received via the video input I/F 208 includes a predetermined detection target subject, such as a human figure, and in a case where the subject is included, the inference unit 207 estimates the position of the subject. The inference unit 207 includes a calculation device, such as a so-called graphics processing unit (GPU), specialized in image processing and inference processing. While GPUs are generally effective in application of learning processing, the same function may be realized with a reconfigurable logic circuit, such as a field-programmable gate array (FPGA). The processing of the inference unit 207 may be performed by the CPU 201.

An internal configuration of the PC 300 will be described below.

The PC 300 includes a CPU 301, a RAM 302, an SSD 303, a network I/F 304, a display unit 305, an operation unit 306, and a device interface (device I/F) 307, and the foregoing components are connected to an internal bus 308.

The CPU 301 controls entire operation of the PC 300 and performs various calculations.

The SSD 303 is a non-volatile, large-capacity storage device. The SSD 303 is used as a persistent storage area for an OS, various programs, and various types of data and is also used as a storage area for various types of short-term data.

The RAM 302 is a high-speed rewritable storage device such as a DRAM, and the OS, the various programs, and the various types of data are loaded into the RAM 302 from the SSD 303. Further, the RAM 302 is also used as a work area of the OS and the various programs.

The CPU 301 realizes operations of the PC 300 described below by executing the programs loaded into the RAM 302 from the SSD 303.

The network I/F 304 is an I/F for connecting to the network 400 and performs communication with external communication apparatuses such as the PTZ camera 100 and the edge AI device 200 via the network 400. The communication by the PC 300 refers to transmitting the imaging-related various settings information to the edge AI device 200 and receiving captured videos and information about current pan and tilt values (imaging direction) and a current zoom value (angle of view) of the PTZ camera 100 from the PTZ camera 100.

The display unit 305 is a display device for displaying captured videos from the PTZ camera 100 and the UI screen that is used to set the predetermined target region and the predetermined composition. While an example in which the PC 300 includes the display device is described herein, this is not a limiting configuration, and other examples including a configuration in which a controller and a display monitor configured to display only captured videos and the UI screen are disposed separately can be applicable.

The operation unit 306 is an interface for receiving user operations on the PC 300, and examples include a mouse, a keyboard, a button, a dial, a joystick, and a touch panel. The operation unit 306 receives user operations and inputs to the UI screen that is used to set the predetermined target region and the predetermined composition described below. In the present exemplary embodiment, intended user operations on the UI screen are mouse operations, and an operation that is performed by the user pressing a button displayed on the UI screen described below is a mouse click operation. User operations on the UI screen are not limited to those described above and may include various other operations such as touch operations on a screen of a display device disposed with a touch panel. The PC 300 generates imaging-related various settings information for setting the predetermined target region and the predetermined composition described below, based on user operations on the UI screen and transmits the generated information to the edge AI device 200 via the network I/F 304.

The device I/F 307 is an interface for connecting to various input devices and includes a USB.

<Description of Operations of Apparatuses in Imaging System>

Next, operations of the apparatuses in the imaging system according to the first exemplary embodiment will be described below with reference to FIGS. 3A to 8B.

The operations in the imaging system according to the present exemplary embodiment are roughly divided into a setting up operation and a tracking operation. The setting up operation is an operation for the imaging-related various settings that are performed to set, for example, the predetermined target region and the predetermined composition, before the tracking operation is started. The tracking operation is an operation for tracking of a detection target subject based on the imaging-related various settings that have been set by the setting up operation.

<Setting Up Operation>

The setting up operation will be described below.

In the present exemplary embodiment, the setting up operation to set the imaging-related various settings includes setting up of the predetermined target region and setting up of the predetermined composition.

In the present exemplary embodiment, an automatic selection region is set in the setting up of the predetermined target region. The automatic selection region refers to a region where a tracking target subject is automatically selected and detected in a captured video.

Further, in the present exemplary embodiment, a setting for imaging in a composition where the entire competition area is centered in the angle of view is set in the setting up of the predetermined composition. Examples of a composition where the entire competition area is centered in the angle of view include a wide-angle composition that captures a wide view of the entire competition area, and an example of such a composition in the present exemplary embodiment is a composition (hereinafter, referred to as "bird's-eye view composition") that captures the entire competition area from a bird's-eye view. In a case of a competition with two players and one referee that is described as an example in the present exemplary embodiment, the bird's-eye view composition is, for example, a composition in imaging a scene in which the referee is in the center and the players are on the right and left of the referee at the beginning or the end of the match.

The predetermined composition is not limited to the composition where the entire competition area is centered in the angle of view, the wide-angle composition, or the bird's-eye view composition, and other examples include a composition set by the user and a specific composition suitable for the type of the competition or the purpose of imaging.

In the imaging system according to the present exemplary embodiment, in response to the PC 300, the edge AI device 200, and the PTZ camera 100 being activated, the PC 300 establishes connections with the edge AI device 200 and the PTZ camera 100 and changes to a standby state.

In response to receipt of an automatic selection region setting up instruction from the user via the operation unit 306, the PC 300 in the standby state starts an operation in a flowchart illustrated in FIG. 3A described below. In response to an input of an automatic selection region setting up instruction from the user, the PC 300 transmits a notification of the input to the edge AI device 200. In response to receipt of the notification from the PC 300, the edge AI device 200 starts an operation in a flowchart illustrated in FIG. 3B described below.

In response to receipt of a bird's-eye view composition setting up instruction from the user via the operation unit 306, the PC 300 in the standby state starts an operation in a flowchart illustrated in FIG. 5B described below. Further, in response to an input of a bird's-eye view composition setting up instruction from the user, the PC 300 transmits a notification of the input to the edge AI device 200 and the PTZ camera 100. In response to receipt of the notification from the PC 300, the PTZ camera 100 starts an operation in a flowchart illustrated in FIG. 5A described below. In response to receipt of the notification from the PC 300, the edge AI device 200 starts an operation in a flowchart illustrated in FIG. 5C described below.

The operation in the flowchart in FIG. 3A that is performed by the PC 300 in response to receipt of an automatic selection region setting up instruction from the user will be described below.

In step S101, in response to receipt of an automatic selection region setting up instruction from the user, the CPU 301 of the PC 300 reads an initial value of the automatic selection region from the SSD 303 and receives the initial value. Examples of the automatic selection region of the initial value that may be used include a region that is selected based on the type of a competition from fixed automatic selection regions determined in advance for each type of competition, and the last automatic selection region used in the previous operation. For example, the CPU 301 may acquire information about the initial value of the automatic selection region by querying the edge AI device 200.

In step S102, the CPU 301 displays, on the display unit 305, the UI screen on which the user can set the automatic selection region.

FIG. 4 is a diagram illustrating an example of the UI screen for setting of the automatic selection region. The UI screen illustrated as an example in FIG. 4 includes components that are used by the user to adjust and determine a bird's-eye view composition described below.

As illustrated in FIG. 4, a captured video received from the PTZ camera 100 is displayed in the left field of the UI screen, and an automatic selection region 500 is superimposed and displayed on the captured video. In the case of the example in FIG. 4, the captured video is a video image in which two players 600*a* and 600*b* and one referee 601 are in a competition area 501 during a match and, for example, a human FIG. 602, such as a substitute player, present outside the competition area 501. While the human FIG. 602 outside the competition area 501 is a substitute player herein, the human FIG. 602 may be other human figures such as a spectator. The automatic selection region 500 is a region that is set to coincide with the competition area 501 by the user by operating the operation unit 306. For example, after the automatic selection region of the initial value is set by the CPU 301, the user sets the automatic selection region 500 as desired by operating the automatic selection region of the initial value via the operation unit 306 as described below.

In the right field of the UI screen, a PTZ setting button 700, an automatic selection region determination button 701, a bird's-eye view composition adjustment start button 702, and a bird's-eye view composition determination button 703 are disposed. The automatic selection region determination button 701 is a button that is pressed by the user to determine the automatic selection region 500 after user operations on the automatic selection region 500 in the left field of the UI screen. The PTZ setting button 700 includes a cross key 710 and a tele/wide button 711. The cross key 710 is used by the user to set the pan and tilt of the PTZ camera 100, and the tele/wide button 711 is used by the user to set the zoom (angle of view) of the PTZ camera 100. In a case where the cross key 710 or the tele/wide button 711 of the PTZ setting button 700 is operated by the user, the PC 300 transmits a pan-tilt-zoom control command based on information on the user operation to the PTZ camera 100. In response to the command, the imaging direction and the angle of view of the PTZ camera 100 are changed, and the captured video that is displayed in the left filed of the UI screen is changed. The PTZ setting button 700 is also used to adjust the bird's-eye view composition described below. Roles of the bird's-eye view composition adjustment start button 702 and the bird's-eye view composition determination button 703 and roles of the PTZ setting button 700 in adjustment of the bird's-eye view composition will be described below.

While, in the present exemplary embodiment, the description has been given of an example in which the user sets the automatic selection region 500 as desired based on the automatic selection region of the initial value, this is not a limiting example. For example, the CPU 301 may detect the competition area 501 from the captured video by using AI technology and automatically set the automatic selection region 500 coinciding with the competition area 501 thus detected. Further, while the automatic selection region 500 is illustrated as a rectangular region in the case in FIG. 4, this is not a limiting case, and the automatic selection region 500 may be in any shape as long as the shape coincides with the competition area 501, such as a polygonal or circular shape. In the present exemplary embodiment, the automatic selection region 500 is a region where tracking target subjects are automatically selected in the captured video as described below, so that the tracking target subjects, such as players and referees, are distinguishable from other subjects, such as substitute players. Specifically, substitute players and spectators outside the automatic selection region 500 are excluded from tracking targets, whereby only players and referees in the automatic selection region 500 are to be tracked.

The UI screen illustrated in FIG. 4 may be displayed by an application program running on the PC 300. Alternatively, a web server may be installed in the edge AI device 200, and the PC 300 may display the UI screen as downloaded content from the web server.

The description of the flowchart in FIG. 3A will continue.

After step S102, the CPU 301 loops the process of step S103 and step S104 until the automatic selection region determination button 701 is pressed by the user.

In step S103, the CPU 301 acquires a user operation on the four vertices of the automatic selection region 500 from the operation unit 306 and sets the automatic selection region 500 based on the positions of the vertices operated by the user. Specifically, the user can set the automatic selection region 500 as desired by operating the positions of the vertices of the automatic selection region 500 via the operation unit 306. Then, the CPU 301 writes, to the RAM 302, coordinate information about the vertices of the automatic selection region 500 set based on the user operations. The user operation on the positions of the four vertices of the automatic selection region 500 may be realized by various operations, such as a drag-and-drop operation using the mouse, and the present exemplary embodiment is not limited to any of the operations.

In step S104, the CPU 301 determines whether the automatic selection region determination button 701 has been pressed by the user via the operation unit 306. Then, in a case where the CPU 301 determines that the automatic selection region determination button 701 has been pressed (YES in step S104), the processing exits the loop process and proceeds to step S105.

In step S105, the CPU 301 reads the automatic selection region coordinate information stored in the RAM 302 and transmits the automatic selection region coordinate information to the edge AI device 200 via the network I/F 304.

Next, the process in the flowchart in FIG. 3B that is performed by the edge AI device 200 in the automatic selection region setting up operation will be described below.

The CPU 201 of the edge AI device 200 is in a state of waiting for automatic selection region coordinate information, and in response to receipt of automatic selection region coordinate information from the PC 300 via the network I/F 204 in step S201, the processing proceeds to step S202, which is the next step.

In step S202, the CPU 201 writes the automatic selection region coordinate information to the RAM 202.

Next, the process in the flowchart in FIG. 5B that is performed by the PC 300 in response to receipt of a bird's-eye view composition setting up instruction from the user will be described below.

As a bird's-eye view composition setting up operation, the PC 300 sets, to the edge AI device 200, the imaging direction (pan and tilt values) and the angle of view (zoom value) of the PTZ camera 100 that are to be set as a bird's-eye view composition. In the present exemplary embodiment, the bird's-eye view composition is a composition where the entire competition area is centered in the angle of view as described above and is a composition for capturing a scene from a bird's-eye view in which a referee is in the center and players are on the right and left of the referee at the beginning or the end of a match.

For example, the bird's-eye view composition is the composition of the captured video displayed in the left field of the UI screen in FIG. 4, i.e., the composition that captures not only the players 600*a* and 600*b* and the referee 601 in the competition area 501 but also the human FIG. 602, such as a substitute player, outside the competition area 501.

At the time of starting the bird's-eye view composition setting up, the CPU 301 of the PC 300 is in a state of waiting for an input of a user operation on the bird's-eye view composition adjustment start button 702 in the right field of the UI screen in FIG. 4. In step S401, in response to receipt of an input from the user pressing the bird's-eye view composition adjustment start button 702, the CPU 301 loops the process of step S402 and step S403 until the bird's-eye view composition determination button 703 is pressed.

The bird's-eye view composition adjustment start button 702 in the right field of the UI screen in FIG. 4 is a button that is pressed by the user to issue an instruction to start adjustment of the bird's-eye view composition, and the bird's-eye view composition determination button 703 is a button that is pressed by the user to issue an instruction to determine the bird's-eye view composition. In response to the bird's-eye view composition adjustment start button 702 being pressed, the PC 300 determines that an instruction to start adjustment of the bird's-eye view composition is issued by the user. Then, in response to the cross key 710 and the tele/wide button 711 of the PTZ camera 100 being operated by the user, the PC 300 transmits, to the PTZ camera 100, a control command including pan-tilt-zoom drive directions and drive amounts based on the user operation. In this way, the PTZ camera 100 adjusts the bird's-eye view composition through pan-tilt-zoom adjustments. After the bird's-eye view composition adjustment, in a case where the bird's-eye view composition is approved and the bird's-eye view composition determination button 703 is pressed by the user, the PC 300 determines the pan, tilt, and zoom values of the PTZ camera 100 at that point as pan, tilt, and zoom values of the bird's-eye view composition. The pan, tilt, and zoom values of the bird's-eye view composition are stored in the edge AI device 200.

The description of the flowchart in FIG. 5B will continue.

In step S402, the CPU 301 waits for an input of a user operation on the cross key 710 or the tele/wide button 711 of the PTZ setting button 700 in FIG. 4. In a case where a user operation on the cross key 710 or the tele/wide button 711 of the PTZ setting button 700 is input, the CPU 301 transmits a pan-tilt-zoom control command based on information on the user operation to the PTZ camera 100. For example, in a case where a pan-tilt operation on the cross key 710 is input, the PC 300 transmits a control command to drive the PTZ camera 100 in pan and tilt using pan and tilt values based on the operation to the PTZ camera 100 via the network I/F 304. Further, for example, in a case where a zoom operation on the tele/wide button 711 is input, the CPU 301 transmits a control command to adjust the zoom of the PTZ camera 100 based on the operation to the PTZ camera 100 via the network I/F 304.

In step S403, the CPU 301 determines whether a user has been pressed the bird's-eye view composition determination button 703 to input an operation via the operation unit 306. Then, in a case where the CPU 301 determines that an input of an operation has been performed by pressing of the bird's-eye view composition determination button 703 (YES in step S403), the processing exits the loop process and proceeds to step S404.

In step S404, the CPU 301 transmits, to the PTZ camera 100, a command to request transmission of the current pan, tilt, and zoom values.

In step S405, the CPU 301 receives information transmitted from the PTZ camera 100 via the network I/F 304 in response to the request command transmitted in step S404. The information received in this process is specifically the current pan, tilt, and zoom values of the PTZ camera 100.

In step S406, the CPU 301 transmits the pan, tilt, and zoom values received in step S404 to the edge AI device 200 via the network I/F 304. The pan, tilt, and zoom values are to be used in the edge AI device 200 as values for setting the PTZ camera 100 to the imaging direction and the angle of view for the bird's-eye view composition.

The operation of the PTZ camera 100 after the determination of the pan, tilt, and zoom values of the bird's-eye view composition by the bird's-eye view composition setting up operation will be described below with reference to the flowchart in FIG. 5A.

The CPU 101 of the PTZ camera 100 is in a state of waiting for a command that is transmitted from the PC 300. In step S301, in response to the CPU 101 receiving a command to transmit the pan, tilt, and zoom values from the PC 300 via the network I/F 105, the processing proceeds to step S302.

In step S302, the CPU 101 reads the current pan, tilt, and zoom values stored in the RAM 102.

In step S303, the CPU 101 transmits the current pan, tilt, and zoom values read from the RAM 102 to the PC 300 via the network I/F 105.

The operation of the edge AI device 200 after the determination of the pan, tilt, and zoom values of the bird's-eye view composition by the bird's-eye view composition setting up operation will be described below with reference to the flowchart in FIG. 5C.

The CPU 201 of the edge AI device 200 is in a state of waiting for information that is transmitted from the PC 300. In step S501, in response to the CPU 201 receiving the pan, tilt, and zoom values for setting the bird's-eye view composition from the PC 300 via the network I/F 204, the processing proceeds to step S502.

In step S502, the CPU 201 writes the received pan, tilt, and zoom values as the pan, tilt, and zoom values of the bird's-eye view composition to the RAM 202.

<Operation in Tracking and Switching to Bird's-Eye View Composition>

The imaging system according to the present exemplary embodiment is configured in such a manner that the control of the PTZ camera 100 is switchable between a first control and a second control different from the first control, based on the distances between the subjects, and this operation will be described below. In the present exemplary embodiment, the PTZ camera 100 is controlled to track subjects automatically as an example of the first control, and the PTZ camera 100 is controlled to set to the bird's-eye view composition as an example of the second control.

In the imaging system according to the present exemplary embodiment, after completion of the automatic selection region setting up and the bird's-eye view composition setting up, switching between the subject tracking operation and the bird's-eye view composition is performed using the imaging-related various settings information that have been set by the setting-ups. In the case of the imaging system according to the first exemplary embodiment, the edge AI device 200 detects subject positions from the captured video captured by the PTZ camera 100 and performs pan-tilt-zoom control of the PTZ camera 100 based on the subject positions, whereby automatic tracking is performed. The edge AI device 200 acquires the distances between the subjects based on the plurality of inferred subject positions and switches between the automatic tracking and the bird's-eye view composition, based on the distances between the subjects.

FIG. 6A is a flowchart illustrating a process of the edge AI device 200 in the tracking operation. The edge AI device 200 controlling the tracking operation acquires the distances between the subjects from the captured video and determines whether to switch to the bird's-eye view composition, based on the distances between the subjects. FIG. 6B is a flowchart illustrating an operation of the PTZ camera 100.

An operation of controlling the tracking operation and switching to the bird's-eye view composition that the edge AI device 200 performs will be described below with reference to the flowchart in FIG. 6A.

In the imaging system according to the present exemplary embodiment, the PTZ camera 100 transmits the captured video sequentially at a predetermined frame rate from the video output I/F 104. The edge AI device 200 sequentially receives the captured video transmitted sequentially at the predetermined frame rate from the PTZ camera 100 via the video input I/F 208 and stores the received captured video in the RAM 202 in the edge AI device 200. The PTZ camera 100 may transmit the captured video sequentially at the predetermined frame rate from the network I/F 105, and in this case, the edge AI device 200 receives the captured video transmitted sequentially via the network I/F 204 and stores the received captured video in the RAM 202. The loop process of the edge AI device 200 from step S601 to step S611 in FIG. 6A is performed on the captured video frame by frame.

In step S601, the CPU 201 of the edge AI device 200 sequentially reads the captured video stored in the RAM 202 and transfers the read captured video to the inference unit 207.

In step S602, the inference unit 207 detects subjects from the captured video and writes information about inference results as results of the detection to the RAM 202. In the present exemplary embodiment, the inference unit 207 includes a trained model generated using a machine learning method, such as deep learning, acquires the captured video as input data, and outputs the inference results as output data. The inference results include position information about human figures, such as players and referees, that are tracking target subjects, types of the tracking targets (e.g., types indicating a player or a referee), and scores indicating the likelihoods thereof. The position information about each subject (human figure) includes coordinate information about four upper-left, upper-right, lower-left, and lower-right vertices of a rectangular region surrounding the subject and information about the width and height of the rectangular region. The inference unit 207 may be configured to output information indicating parts of subjects (human figures) on the image as output data. Examples of parts of subjects being human figures in the present exemplary embodiment include parts such as noses, eyes, ears, and heads and joint parts and skeletal parts such as shoulders, elbows, wrists, buttocks, knees, and ankles. The inference unit 207 may be configured to output information indicating at least one of the parts of the subjects on the image as output data. An example of using the information about the parts of the human figures will be described below. The inference unit 207 acquires the information of the inference results as one set.

In step S603, the CPU 201 reads, from the RAM 202, coordinate information representing the automatic selection region stored in the RAM 202 in step S202 in FIG. 3B.

In step S604, the CPU 201 reads the position information about the rectangular regions of the subjects from the inference results stored in the RAM 202 in step S602 and counts the number of subjects present in the automatic selection region based on the position information about the rectangular regions. Specifically, the CPU 201 counts the number of human figures present in the automatic selection region. In the case of the present exemplary embodiment, the CPU 201 counts a subject as a subject present in the automatic selection region in a case where a center point of a lower side of the rectangular region of the subject is included within the automatic selection region.

In order to determine whether the subjects are within the automatic selection region regardless of the direction of the pan and tilt and the zoom value of the PTZ camera 100, the CPU 201 converts the coordinate system of the coordinate information representing the center point of the lower side of the rectangular region of the subject and the automatic selection region to a predetermined coordinate system. In the case of the present exemplary embodiment, the coordinate information representing the center points of the lower sides of the rectangular regions of the subjects and the vertices of the automatic selection region is coordinate information in an orthogonal coordinate system that is represented as (x, y) on the captured video. Thus, the CPU 201 converts the coordinate information in the orthogonal coordinate system to coordinate information in a polar coordinate system in which the pan and tilt angles of the PTZ camera 100 facing the front of the competition area are 0 degrees, where $\theta q$ [rad] is the angle in the pan direction and $\varphi q$ [rad] is the angle in the tilt direction. Consequently, the coordinate information representing the subjects and the automatic selection region is represented as coordinate information independent of the pan, tilt, and zoom values of the PTZ camera 100. With this configuration, the CPU 201 determines whether the subjects are within the automatic selection region, regardless of the pan, tilt, and zoom values of the PTZ camera 100.

As an example of a method for converting an orthogonal coordinate system represented as (x, y) to a polar coordinate system, a method for converting two-dimensional coordinates P(x, y) on the captured video to three-dimensional coordinates Q(X, Y, Z) with the PTZ camera 100 as the origin will be described below with reference to FIGS. 7A to 7C.

Figure 7A:
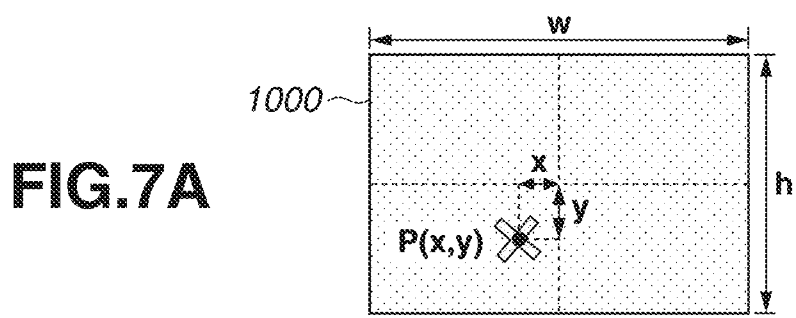
FIG. 7A is a diagram illustrating a captured video captured by the PTZ camera in an orthogonal coordinate system (x, y).

FIG. 7A is a diagram illustrating a captured video 1000 of the PTZ camera 100 in an orthogonal coordinate system (x, y), and the two-dimensional coordinates P(x, y) in FIG. 7A represent a point (pixel) to be converted to the three-dimensional coordinates Q(X, Y, Z). In FIG. 7A, x [pixel] values to the right of the center of the captured video 1000 are positive, and y [pixel] values to the bottom of the center are positive. The captured video 1000 has a video size of w×h [pixels].

Figure 7B:
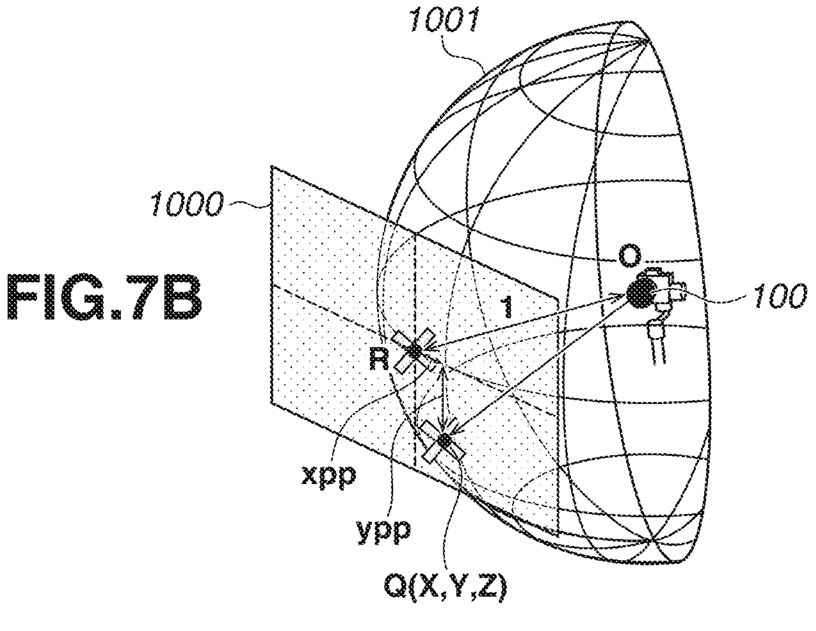
FIG. 7B is a diagram illustrating a spherical surface having a radius that is the distance from the PTZ camera to a subject in the captured video.

FIG. 7B illustrates a spherical surface 1001 in a three-dimensional space with the position of the PTZ camera 100 as an origin O and the distance from the PTZ camera 100 to the subjects in the captured video as a radius. In FIG. 7B, for simplification of description, the radius of the spherical surface 1001 is normalized to 1. In the three-dimensional space with the position of the PTZ camera 100 as the origin O as illustrated in FIG. 7B, the captured video 1000 illustrated in FIG. 7A is represented as a two-dimensional image being tangent to the spherical surface 1001 at its center R.

Figure 7C:
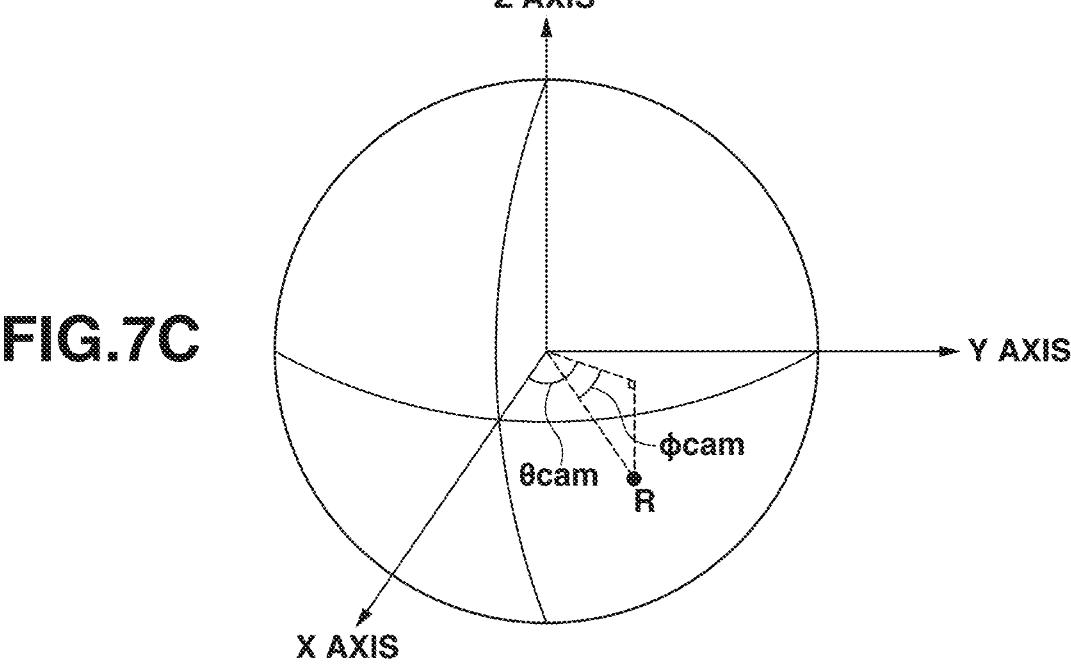
FIG. 7C is a diagram illustrating current pan and tilt angles of the PTZ camera.

FIG. 7C is a diagram illustrating a current pan angle θcam and a current tilt angle φcam of the PTZ camera 100 in a case where the pan and tilt angles of the PTZ camera 100 facing the front of the competition area are 0 degrees. The front of the PTZ camera 100 corresponds to the x-axis direction in FIG. 7C. The pan angle θcam, the tilt angle φcam, a horizontal zoom angle of view ψwcam (not illustrated), and a vertical zoom angle of view ψhcam (not illustrated) can be acquired by the edge AI device 200 by requesting the current pan, tilt, and zoom values from the PTZ camera 100.

As illustrated in FIG. 7B, a distance xpp in the x-axis direction and a distance ypp in the y-axis direction from the center R of the captured video 1000 to the three-dimensional coordinates Q(X, Y, Z) can be calculated from the following formulas (1) and (2):

$$xpp = 2x^{\times}\tan(\psi wcam/2)/w, \text{ and} \quad \text{formula (1)}$$

$$ypp = 2y^{\times}\tan(\psi hcam/2)/h. \quad \text{formula (2)}$$

Further, the three-dimensional coordinates Q(X, Y, Z) can be calculated from the following formula (3):

$$\begin{pmatrix} X \\ Y \\ Z \end{pmatrix} = \begin{pmatrix} \cos\theta cam & -\sin\theta cam & 0 \\ \sin\theta cam & \cos\theta cam & 0 \\ 0 & 0 & 1 \end{pmatrix} \begin{pmatrix} \cos\varphi cam & 0 & -\sin\varphi cam \\ 0 & 1 & 0 \\ \sin\varphi cam & 0 & \cos\varphi cam \end{pmatrix} \begin{pmatrix} 1 \\ xpp \\ ypp \end{pmatrix}. \quad \text{formula (3)}$$

Since the orientation of the PTZ camera 100 is the directions of the pan angle θcam and the tilt angle φcam, the three-dimensional coordinates Q(X, Y, Z) can be calculated by rotating the coordinate axis around the Z-axis by θcam and around the Y-axis by φcam as indicated by formula (3).

As described above, the CPU 201 converts the point P(x, y) on the captured video 1000 to the three-dimensional coordinates Q(X, Y, Z) with the PTZ camera 100 as the origin.

The CPU 201 converts the three-dimensional coordinates Q(X, Y, Z) to a pan angle θq and a tilt angle φq viewed from the PTZ camera 100 using the following formulas (4) and (5):

$$\theta q = \arctan\left(\frac{Y}{X}\right), \text{ and} \quad \text{formula (.4)}$$

$$\varphi q = \arctan\left(Z/\sqrt{X^2+Y^2}\right). \quad \text{formula (5)}$$

As described above, the CPU 201 converts the coordinate information representing the center point of the lower side of the rectangular region of the subject and the four vertices of the automatic selection region to the pan angle θq and the tilt angle φq viewed from the PTZ camera 100 by using formulas (1) to (5). Thus, the CPU 201 performs step S604 even in a case where there is a change in the pan, tilt, and zoom values of the PTZ camera 100.

The above-described method for calculating into the polar coordinate is merely an example, and any known calculation method for converting into polar coordinates may be used.

While, in the present exemplary embodiment, the conversion into polar coordinates is performed based on the pan, tilt, and zoom values of the PTZ camera 100, in a case of, for example, a camera that can only be controlled in pan, the conversion into polar coordinates can be performed based on pan values. The same applies to cameras that can only be controlled in tilt, and the conversion into polar coordinates can be performed based on tilt values.

In the present exemplary embodiment, the reason of using the center point of the lower side of the rectangular region of the subject as described above is to determine whether a standing position of the subject is within the automatic selection region. The method using the center point of the lower side of the rectangular region of the subject to determine whether the subject is within the automatic selection region is merely an example, and other methods including a method using information representing parts of a subject may also be applicable. Specifically, information representing at least one of the parts acquired by the inference unit 207 may be used as information representing parts of the subject to determine whether the subject is within the automatic selection region.

Figure 15:
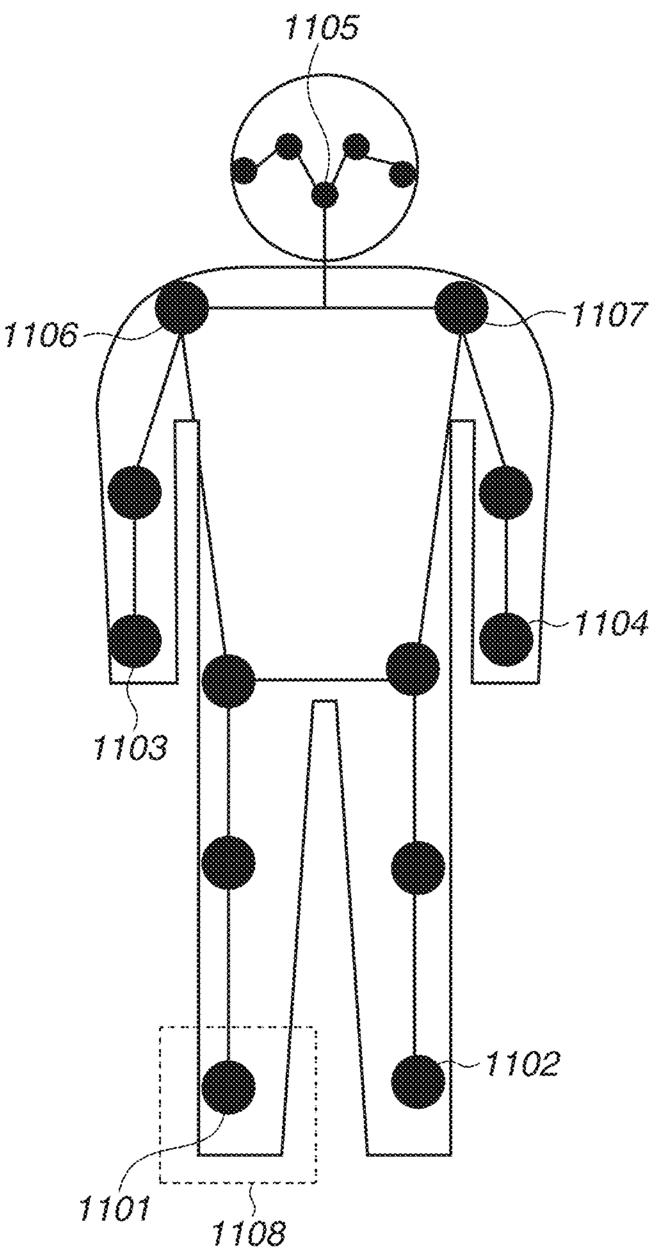
FIG. 15 is a diagram illustrating an example of parts of a subject that is a human figure.

An example of information representing parts of a subject that is a human figure is coordinate information representing positions of parts, such as a head, a nose, eyes, ears, shoulders, elbows, wrists, buttocks, knees, and ankles, as illustrated in FIG. 15. The information representing parts may include coordinate information representing rectangular regions surrounding the parts. In FIG. 15, for example, a position 1105 represents a head position, positions 1106 and 1107 represent shoulder positions, positions 1103 and 1104 represent wrist positions, and positions 1101 and 1102 represent ankle positions. In FIG. 15, a rectangular region 1108 is an example of a rectangular region surrounding a foot. The inference unit 207 is capable of outputting coordinate information representing at least one of the parts. Then, the CPU 201 determines whether the subject is within the automatic selection region by using the information representing at least one of the parts that has been output from the inference unit 207.

Specifically, in a case where, for example, coordinate information representing at least one of the right and left ankles of a subject (human figure) is within the automatic selection region, the CPU 201 determines that the subject is within the automatic selection region. With this configuration, the CPU 201 can accurately determine that a subject that is a human figure is within the automatic selection region even in a case where, for example, one foot of the human figure near a boundary of the automatic selection region is outside the automatic selection region.

Further, in a case where, for example, coordinate information representing at least one of the wrists, the head, and the shoulders other than the ankles is within the automatic selection region, the CPU 201 may determine that the subject is within the automatic selection region. With this configuration, the CPU 201 can determine that a subject (player) is within the automatic selection region in a competition, such as judo, in which a match continues even after the subject falls to a floor, even in a case where the ankles are not within the automatic selection region but a wrist or head is within the automatic selection region. In this case, by determining that a part of the body of the subject, not necessarily the ankles, is within the automatic selection region, determination that the subject is within the automatic selection region can be performed with higher accuracy.

Further, in a case where, for example, coordinate information representing a rectangular region surrounding the right or left foot of the subject that is a human figure is within the automatic selection region, the CPU 201 may determine that the subject is within the automatic selection region. Specifically, in a case where at least one of the center points of the lower sides of the rectangular regions surrounding the right and left feet is within the automatic selection region, the CPU 201 may determine that the subject is within the automatic selection region.

Further, besides the method of determining whether parts of subjects are within the automatic selection region, other determination methods may also be applicable. Other determination methods are based on positions that can be acquired from positions of parts of subjects, such as a method of determining whether midpoints of both feet or a region near parts of subject is within the automatic selection region.

The description of the flowchart in FIG. 6A will continue.

In step S605, the CPU 201 determines whether the condition that the counted number of subjects in step S604 is a predetermined number is satisfied. In the present exemplary embodiment, since two players and one referee during a match are described above as an example, the predetermined number in step S605 is three. In a case where the CPU 201 determines that the counted number of subjects is three (YES in step S605), the processing proceeds to the automatic tracking process from step S606 and subsequent steps, whereas in a case where the CPU 201 determines that the counted number of subjects is not three (NO in step S605), steps S606 to S611 are skipped, and the processing proceeds to the next loop process.

In a case where the CPU 201 determines that the number of subjects is not three in step S605 in the loop process after determination that the number of subjects is three and starting the tracking operation, the CPU 201 may control the pan, tilt, and zoom values of the PTZ camera 100 to be fixed. Specifically, in a case where the number of human figures in the automatic selection region changes to, for example, less than the predetermined number (less than three) after the automatic tracking is started, the CPU 201 stops the automatic tracking control. An example of a case where the number of subjects changes to less than three may be a case where two out of three players move outside the automatic selection region and the number of subjects consequently changes to less than three. In this case, since the automatic tracking control is stopped, the two players are prevented from being out of the frame as a result of primarily tracking of the one subject (e.g., referee) remaining in the automatic selection region (competition area). Then, in a case where the two players return within the automatic selection region and the CPU 201 determines that the number of subjects in the automatic selection region is three in step S605, the processing proceeds to step S606 so that the control (automatic tracking) of the PTZ camera 100 is performed again.

In step S606, the CPU 201 performs a distance acquisition process of acquiring the distances between the subjects in the automatic selection region and a distance determination process of determining whether the longest distance between the subjects is greater than or equal to the predetermined distance. The predetermined distance is a distance threshold that is set to an appropriate distance for each type of competition. For example, in a case where a match is of a type in which positions of players at the beginning of the match are mostly fixed, such as judo or sumo, it is suitable to set the distance between the players at the beginning of the match as the predetermined distance. However, this is not a limiting example, and the predetermined distance may be various distances for each type of competition or a distance set by the user as desired.

The distances between the subjects and the longest distance between the subjects will be described below with reference to FIGS. 8A and 8B.

Figure 8A:
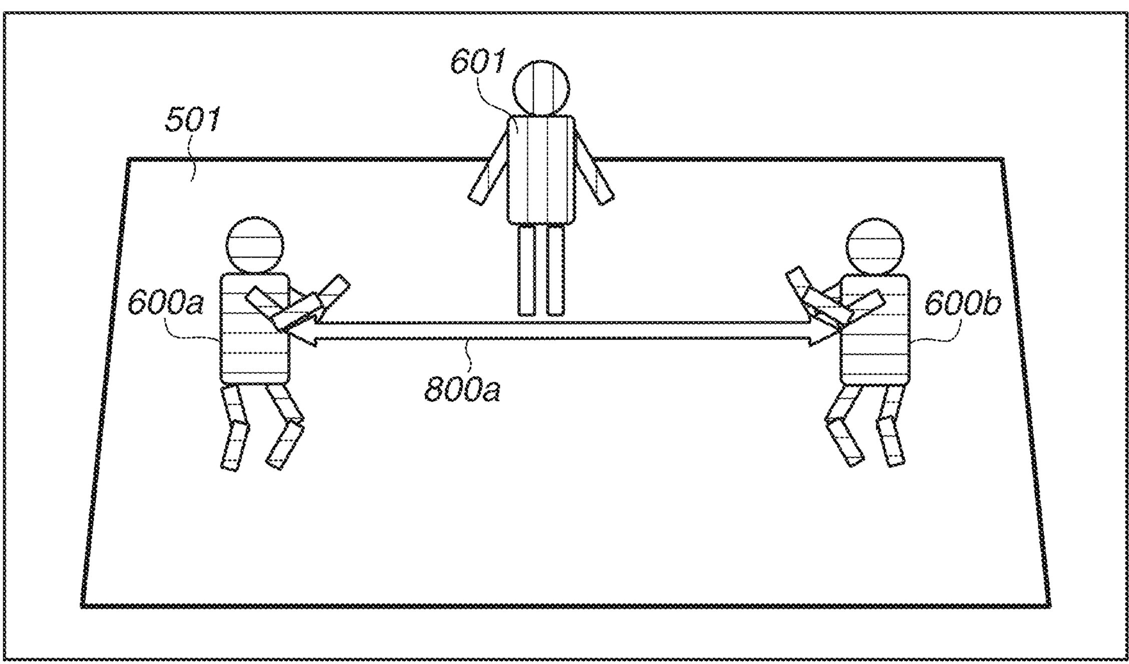
FIG. 8A is a diagram illustrating a positional relationship between players and a referee at the beginning or the end of a match.
Figure 8B:
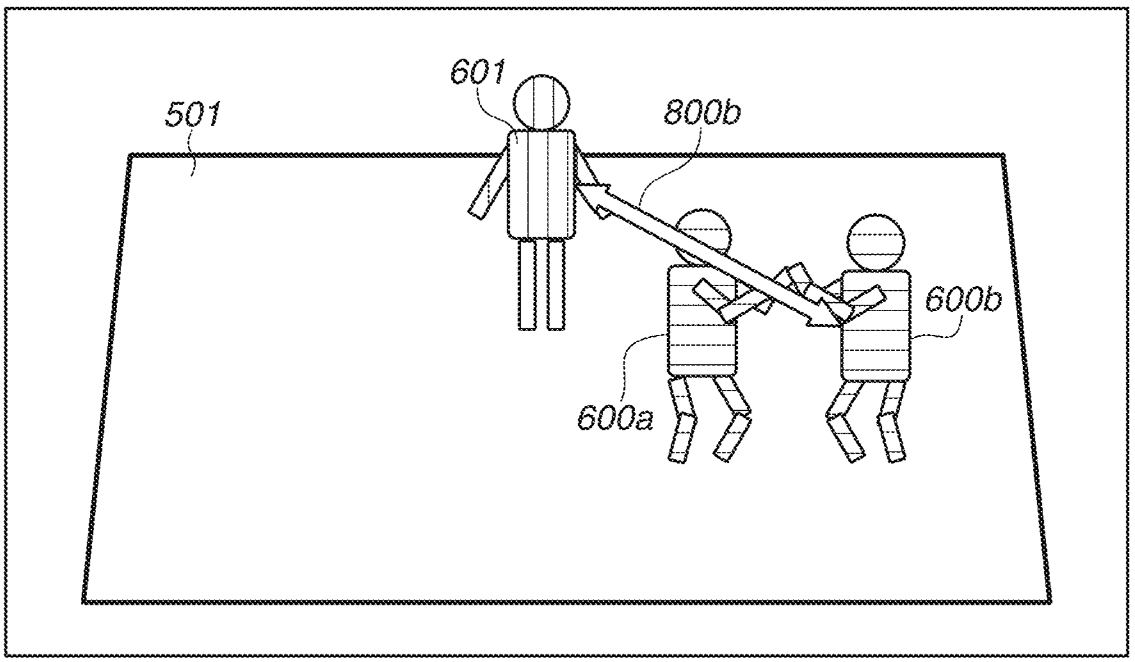
FIG. 8B is a diagram illustrating a positional relationship between the players and the referee during a match.

FIG. 8A illustrates an example of a positional relationship between players and a referee at the beginning or the end of a match, and FIG. 8B illustrates an example of a positional relationship between the players and the referee during the match.

In the case of the positional relationship between the players and the referee at the beginning or the end of the match in FIG. 8A, a longest distance 800*a* between the subjects among the distances between the two players 600*a* and 600*b* and one referee 601 is the distance between the players 600*a* and 600*b*. On the other hand, in the case of the positional relationship between the players and the referee during the match in FIG. 8B, the distances between the players 600*a* and 600*b* and the referee 601 are often short. In the case of the example in FIG. 8B, a longest distance 800*b* between the subjects is, for example, the distance between the player 600*b* and the referee 601. As described above, the longest distance between the subjects at the beginning or the end of a match is often different from the longest distance between the subjects during the match. Thus, acquiring the longest distance between the subjects leads to determination of whether the match is at the beginning, at the end or underway.

In the present exemplary embodiment, the distance between the players at the beginning of a match is set as the predetermined distance. With this configuration, for example, in a case where the longest distance between the subjects is less than the predetermined distance, the CPU 201 determines that the match is underway, whereas in a case where the longest distance between the subjects is greater than or equal to the predetermined distance, the CPU 201 determines that the match is at the beginning or the end.

In step S606, in a case where the CPU 201 determines that the longest distance between the subjects is less than the predetermined distance (NO in step S606), the processing proceeds to step S607.

In step S607, the CPU 201 determines the three subjects detected in the automatic selection region as tracking targets and calculates the position of the center of gravity of the three subjects. For example, the CPU 201 calculates the position of the center of gravity of two or more (e.g., three) subjects based on an average of positions of center points of the rectangular regions of the subjects. This is not a limiting example of methods for calculating the position of the center of gravity of the subjects, and other calculation methods may be used, such as a method in which a center point of a circumscribed rectangular region surrounding all the three subjects or an average of positions of center positions of only the players by distinguishing between the players and the referee is determined as the position of the center of gravity.

In step S608, the CPU 201 determines whether the position of the center of gravity calculated in step S607 corresponds to the center position of the angle of view on the captured video. In a case where the CPU 201 determines that the position of the center of gravity corresponds to the center position of the angle of view (YES in step S608), the processing proceeds to the next loop process by skipping the process up to step S611. On the other hand, in a case where the CPU 201 determines that the position of the center of gravity does not correspond to the center position of the angle of view (NO in step S608), the processing proceeds to step S609.

In step S609, the CPU 201 calculates the difference between the position of the center of gravity calculated in step S607 and the center position of the angle of view on the captured video and calculates a pan angular velocity as a pan adjustment amount and a tilt angular velocity as a tilt adjustment amount based on the difference. While, in the present exemplary embodiment, the difference between the calculated position of the center of gravity and the center position of the angle of view on the captured video is calculated, the conversion into polar coordinates described above may be performed, and the difference may be calculated in the polar coordinate space. For example, as for angular velocity calculation, an applicable method exampled is that a distance that is the difference between coordinate values in the pan and tilt directions is multiplied by a predetermined coefficient and pan and tilt rotation directions are determined based on whether the calculated value is positive or negative. Since the foregoing technologies are publicly-known technologies, detailed descriptions thereof are omitted.

Further, in step S609, the CPU 201 calculates a zoom adjustment amount so that the rectangular regions remain roughly constant in size. As to the sizes of the rectangular regions of the subjects, not only the size of the circumscribed rectangular region of the subjects but also a size of a human figure part, such as a face size, may be detected, and the zoom adjustment amount may be calculated so that the size remains constant. As to the sizes of the rectangular regions of the subjects, one subject present in the automatic selection region may be selected randomly and the size of the rectangular region of the selected subject may be calculated, or an average size of the rectangular regions of the three subjects may be calculated. Alternatively, the zoom adjustment amount may be calculated in such a manner that the size of the circumscribed rectangular region surrounding the three subjects remains constant.

The subject tracking method using the technology of calculating pan and tilt rotation directions and speeds and performing control as described above is an example. Alternatively, any other method is applicable for subject tracking, such as a method in which target positions in pan and tilt rotations are calculated and subject tracking is performed.

In step S610, the CPU 201 converts results of the calculation in step S609 into a control command based on a protocol determined in advance as a method for controlling the PTZ camera 100 and writes the control command to the RAM 202.

In step S611, the CPU 201 reads the control command converted and written to the RAM 202 in step S610 and transmits the read control command to the PTZ camera 100 via the network I/F 204, and the processing returns to the beginning of the loop process.

While, in the present exemplary embodiment, the description has been given of the example in which determination of whether the position of the center of gravity and the center of the angle of view correspond to each other is performed in step S608, a so-called dead band may be set to suppress the control over the PTZ camera 100 in a case where, for example, the difference between the position of the center of gravity and the center of the angle of view is within a predetermined range. This prevents the PTZ camera 100 from being controlled with excessively high sensitivity.

In step S612 after the determination that the longest distance between the subjects is greater than or equal to the predetermined distance in step S606, the CPU 201 reads the pan, tilt, and zoom values representing the bird's-eye view composition written to the RAM 202 in step S502. Then, the CPU 201 determine to set the pan, tilt, and zoom values as tracking target positions. Specifically, the pan, tilt, and zoom values written to the RAM 202 in step S502 are the pan, tilt, and zoom values of the bird's-eye view composition. Thus, determining to set the values as tracking target positions leads to switching of the composition in imaging by the PTZ camera 100 to the bird's-eye view composition.

In step S613, the CPU 201 generates a control command from the pan, tilt, and zoom values of the bird's-eye view composition read in step S612 in accordance with a protocol determined in advance as a method for controlling the PTZ camera 100 and writes the control command to the RAM 202.

In step S614, the CPU 201 reads the control command written to the RAM 202 in step S613 and transmits the control command to the PTZ camera 100 via the network I/F 204, and then the processing returns to the beginning of the loop process.

A process in the flowchart in FIG. 6B that is performed by the PTZ camera 100 in the tracking operation will be described below.

In step S701, the CPU 101 of the PTZ camera 100 receives the control command from the edge AI device 200 performing the operation in the flowchart in FIG. 6A via the network I/F 105.

The CPU 101 writes the control command transmitted from the edge AI device 200 to the RAM 102, and then the processing proceeds to step S702.

In step S702, the CPU 101 reads, from the control command stored in the RAM 102, a drive direction value and a drive amount value that correspond to the adjustment amounts in the pan and tilt directions. The CPU 101 reads, from the control command, a lens drive direction value and a drive amount value that correspond to the zoom adjustment amount.

Next, in step S703, the CPU 101 calculates drive parameters for pan-tilt-zoom driving, based on the values read from the RAM 102 in step S702. For example, the CPU 101 calculates drive parameters for control of the motor of the drive unit 109 for pan and tilt driving and a drive parameter for zoom driving, based on the values read from the RAM 102. The CPU 101 may convert the drive direction values and the drive amount values contained in the received control command into drive parameters by referring to a conversion table stored in advance in the ROM 103.

In step S704, the CPU 101 controls the drive unit 109 via the drive I/F 108 in accordance with the drive parameters calculated in step S703. The drive unit 109 performs pan-tilt-zoom driving in accordance with the parameters, and the PTZ camera 100 performs an operation of the imaging direction (pan and tilt directions) and the angle of view (zoom).

As described above, in the imaging system according to the first exemplary embodiment, the tracking operation and the bird's-eye view composition are switched in accordance with the distances between the subjects. Thus, with the imaging system according to the present exemplary embodiment, the composition in imaging by the PTZ camera 100 and the camera work is changeable in accordance with the situation where the match is at the beginning, at the end, or underway, which reduces inconvenience to the user (operator).

In the above-described example in the first exemplary embodiment, the edge AI device 200 detects subjects from the captured video of the PTZ camera 100, and the tracking operation and the bird's-eye view composition are switched in accordance with the distances between the detected subjects. In an example in a second exemplary embodiment described below, the process of the edge AI device 200 according to the first exemplary embodiment is performed in the PTZ camera 100. Specifically, in the present exemplary embodiment, the functions of the imaging control apparatus are included in the PTZ camera 100. Differences from the first exemplary embodiment will be mainly described below, and the redundant descriptions will be omitted.

Figure 9:
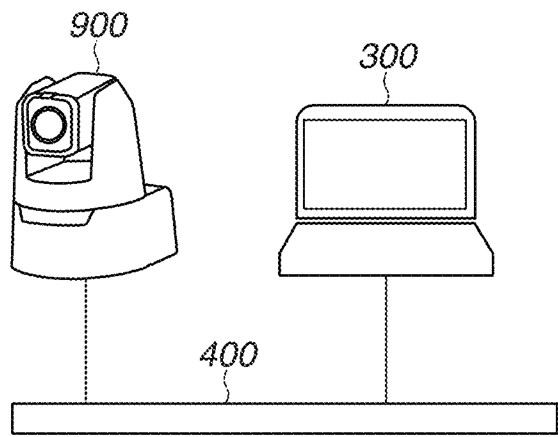
FIG. 9 is a diagram illustrating an example of a configuration of an imaging system according to a second exemplary embodiment.

FIG. 9 is a diagram illustrating an example of a configuration of an imaging system according to the present exemplary embodiment.

As illustrated in FIG. 9, a PTZ camera 900 and the PC 300 are connected to each other via the network 400 in the imaging system according to the present exemplary embodiment. In the case of the second exemplary embodiment, the PTZ camera 900 detects subjects from a captured video captured by the PTZ camera 900, performs pan-tilt-zoom operations in accordance with results of the detection, and tracks the subjects automatically. The PTZ camera 900 according to the present exemplary embodiment acquires the distances between the subjects and performs switching between the tracking operation and the bird's-eye view composition in accordance with the distances between the subjects. The PC 300 according to the present exemplary embodiment sets the imaging-related various settings as in the case of the first exemplary embodiment described above, and the imaging-related various settings information is transmitted to the PTZ camera 900.

FIG. 10 is a diagram illustrating internal configurations of the PTZ camera 900 and the PC 300 in the imaging system according to the present exemplary embodiment.

The internal configuration and operations of the PC 300 according to the present exemplary embodiment are broadly similar to those of the PC 300 according to the first exemplary embodiment, and the detailed redundant descriptions are omitted. In the case of the present exemplary embodiment, the PC 300 communicates with the PTZ camera 900 via the network I/F 304. A CPU 901 to an internal bus 910 of the PTZ camera 900 are broadly similar to the CPU 101 to the internal bus 110 of the PTZ camera 100 according to the first exemplary embodiment, and the detailed redundant descriptions are omitted.

In the case of the present exemplary embodiment, the PTZ camera 900 includes an inference unit 911. The inference unit 911 performs determination of whether subjects are present in image data transferred from the image processing unit 906 to the RAM 902, and in a case where a subject is present, the inference unit 911 estimates the position of the subject. A configuration and an inference process of the inference unit 911 are similar to those of the inference unit 207 in the edge AI device 200 according to the first exemplary embodiment, and the detailed redundant descriptions are omitted. The process of the inference unit 911 may be performed by the CPU 901.

The operations of the apparatuses in the imaging system according to the present exemplary embodiment will be described below with reference to FIGS. 11A and 11B to FIG. 13. Flowcharts in FIGS. 11A, 11B, 12A, 12B, and 13 correspond to flowcharts in FIGS. 3A, 3B, 5A, 5B, 5C, 6A, and 6B in the first exemplary embodiment, and the steps are broadly similar in processing. Mainly different processing from the first exemplary embodiment will be described below, and the redundant descriptions will be omitted.

FIGS. 11A and 11B are flowcharts illustrating a procedure of a setting up operation that is to set imaging-related various settings for the automatic selection region in the imaging system according to the present exemplary embodiment. FIG. 11A illustrates a flowchart of an operation of the PTZ camera 900, and FIG. 11B illustrates a flowchart of an operation of the PC 300. In the present exemplary embodiment, the PC 300 generates imaging-related various settings information for the automatic selection region based on user operations and transmits the generated information to the PTZ camera 900. Then, the PTZ camera 900 stores the imaging-related various settings information that has been received from the PC 300.

Steps S901 to S904 in the flowchart in FIG. 11B illustrating the automatic selection region setting up operation of the PC 300 are broadly similar to steps S101 to S104 in FIG. 4A in the first exemplary embodiment, and the redundant descriptions are omitted. In a case where the CPU 301 determines that a user has pressed the automatic selection region determination button 701 to perform an input via the operation unit 306 (YES in step S904), the processing exits the loop process and proceeds to step S905.

In step S905, the CPU 301 of the PC 300 reads coordinate information representing the automatic selection region from the RAM 302 and transmits the coordinate information to the PTZ camera 900 via the network I/F 304.

In step S801 in FIG. 11A, the CPU 901 of the PTZ camera 900 receives the coordinate information representing the automatic selection region that has been transmitted from the PC 300 via the network I/F 905.

In step S802, the CPU 901 writes the received coordinate information representing the automatic selection region to the RAM 902.

FIGS. 12A and 12B are flowcharts illustrating a procedure of a setting up operation to set imaging-related various settings for the bird's-eye view composition in the imaging system according to the present exemplary embodiment. FIG. 12A illustrates a flowchart of an operation of the PTZ camera 900, and FIG. 12B illustrates a flowchart of an operation of the PC 300. In the case of the present exemplary embodiment, the PC 300 generates imaging-related various settings information for the bird's-eye view composition based on user operations and transmits the generated information to the PTZ camera 900. The PTZ camera 900 stores the imaging-related various settings information that has been received from the PC 300.

The operation of the PC 300 will be described below with reference to FIG. 12B.

Step S1101 is broadly similar to step S401 in FIG. 5B in the first exemplary embodiment described above, and the redundant description is omitted.

A next loop process of step S1102 and step S1103 is broadly similar to the loop process of step S402 and step S403 in FIG. 5B in the first exemplary embodiment, and the redundant descriptions are omitted. In a case where the CPU 301 determines that a user has pressed the bird's-eye view composition determination button 703 to perform an input via the operation unit 306 (YES in step S1103), the processing exits the loop process and proceeds to step S1104.

In step S1104, the CPU 301 transmits an instruction command (referred to as "storage instruction command") to store the pan, tilt, and zoom values to the PTZ camera 900 via the network I/F 304.

The operation of the PTZ camera 900 will be described below with reference to FIG. 12A.

In step S1001, the CPU 901 of the PTZ camera 900 receives the storage instruction command transmitted from the PC 300 via the network I/F 905.

In step S1002, the CPU 901 writes the pan, tilt, and zoom values of the PTZ camera 900 at the time of receiving the storage instruction command from the PC 300 as values for the bird's-eye view composition to the RAM 902.

FIG. 13 is a flowchart illustrating an operation in tracking that is performed by the PTZ camera 900 after completion of the automatic selection region setting up and the bird's-eye view composition setting up in the imaging system according to the present exemplary embodiment. In the case of the imaging system according to the present exemplary embodiment, the PTZ camera 900 detects subject positions from the captured video and performs pan-tilt-zoom operations in accordance with the subject positions to perform automatic tracking. Further, the PTZ camera 900 according to the present exemplary embodiment calculates the distances between the subjects based on the subject positions inferred by the inference unit 911 and performs switching between the automatic tracking and the bird's-eye view composition in accordance with the distances between the subjects.

As in the case of the first exemplary embodiment described above, the captured video captured sequentially at the predetermined frame rate is also sequentially stored in the RAM 902 in the PTZ camera 900 according to the present exemplary embodiment. The PTZ camera 900 performs a loop process of detecting subjects from the captured video stored in the RAM 902 and tracking the subjects. The loop process from step S1201 to step S1212 in FIG. 13 is performed on the captured video frame by frame.

In step S1201, the CPU 901 of the PTZ camera 900 sequentially reads the captured video stored in the RAM 902 and transfers the captured video to the inference unit 911.

In step S1202, the inference unit 911 detects subjects in the captured video read from the RAM 902 and writes inference result information as results of the detection to the RAM 902. Like the inference unit 207 according to the first exemplary embodiment, the inference unit 911 according to the present exemplary embodiment includes a trained model generated using a machine learning method such as deep learning, acquires the captured video as input data, and outputs the inference results as output data. As described above, the inference results are information including position information about human figures, such as players and referees, types, and scores indicating the likelihoods, and the position information includes coordinate information about four vertices of each rectangular region and information about the width and height of the rectangular region.

In step S1203, the CPU 901 reads the coordinate information representing the automatic selection region stored in the RAM 902 in step S802 in FIG. 11B.

In step S1204, the CPU 901 reads the position information about the rectangular regions of the subjects from the inference results stored in the RAM 902 in step S1202 and counts the number of subjects present in the automatic selection region, based on the position information about the rectangular regions. The process of counting the number of subjects present in the automatic selection region is similar to the process according to the first exemplary embodiment described above.

In step S1205, the CPU 901 determines whether the counted number of subjects in step S1204 is the predetermined number (which is also three in the present exemplary embodiment). In a case where the CPU 901 determines that the counted number of subjects is three (YES in step S1205), the processing proceeds to step S1206, whereas in a case where the CPU 901 determines that the counted number of subjects is not three (NO in step S1205), the processing skips the process from step S1206 to step S1212 and proceeds to the next loop process.

Like the first exemplary embodiment described above, also in the present exemplary embodiment, in a case where the CPU 901 determines that the number of subjects is less than three in step S1205 after the determination that the number of subjects is three and starting the tracking, the CPU 901 may fix the pan, tilt, and zoom values. Then, in a case where the two players return within the automatic selection region and the CPU 901 determines that the number of subjects in the automatic selection region is three in step S1205 (YES in step S1205), the processing proceeds to step S1206, and the control of the PTZ camera 100 is performed again.

In step S1206, the CPU 901 acquires the longest distance between the subjects among the distances between the subjects present in the automatic selection region and determines whether the longest distance between the subjects is greater than or equal to a predetermined distance. The predetermined distance is the same distance threshold as in the first exemplary embodiment. In a case where the CPU 901 determines that the longest distance between the subjects is less than the predetermined distance (NO in step S1206), the processing proceeds to step S1207.

In step S1207, the CPU 901 determines the three subjects detected in the automatic selection region as tracking targets and calculates the position of the center of gravity of the three subjects as in the first exemplary embodiment.

In step S1208, the CPU 901 determines whether the position of the center of gravity calculated in step S1207 corresponds to the center position of the angle of view on the captured video. In a case where the CPU 901 determines that the position of the center of gravity corresponds to the center position of the angle of view (YES in step S1208), the processing skips the subsequent steps and proceeds to the next loop process, whereas in a case where the CPU 901 determines that the position of the center of gravity does not correspond to the center position of the angle of view (NO in step S1208), the processing proceeds to step S1209.

In step S1209, the CPU 901 calculates the difference between the position of the center of gravity calculated in step S1207 and the center position of the angle of view in the captured video and calculates pan and tilt adjustment amounts based on the difference. Further, in step 1209, the CPU 901 calculates a zoom adjustment amount so that the rectangular regions of the subjects remain constant in size. As in the first exemplary embodiment described above, the zoom adjustment may be performed in accordance with, for example, a size of a human figure part, such as a face size. As to the size of the rectangular region of the subjects, the size of the rectangular region of a subject selected randomly from the automatic selection region or an average size of the rectangular regions may be used. The zoom adjustment amount may be calculated in such a manner that the size of the circumscribed rectangular region surrounding the three subjects remains constant.

In step S1210, the CPU 901 calculates drive values corresponding to the adjustment amounts in the pan and tilt directions and a lens drive direction value and a drive amount value that correspond to the zoom adjustment amount.

In step S1211, the CPU 901 derives (calculates) drive parameters for pan-tilt-zoom driving based on the values calculated in step S1210.

Then, in step S1212, the CPU 901 controls the drive unit 909 via the drive I/F 908 in accordance with the drive parameters derived in step S1211. This causes the drive unit 909 to drive in accordance with the drive parameters, and the imaging direction of the PTZ camera 900 is changed (pan and tilt operations). Further, an operation to change the angle of view is performed. After step S1212, the processing returns to step S1201 at the beginning of the loop process.

Further, in a case where the CPU 901 determines that the longest distance between the subjects is greater than or equal to the predetermined distance in step S1206 and the processing proceeds to step S1213, the CPU 901 reads the pan, tilt, and zoom values corresponding to the bird's-eye view composition written in step S1202 from the RAM 902. The CPU 901 determines the pan, tilt, and zoom values as a tracking target position. Specifically, by determining to set the pan, tilt, and zoom values written to the RAM 902 in step S1202 as a tracking target position, the composition in imaging by the PTZ camera 100 is switched to the bird's-eye view composition.

In step S1214, the CPU 901 derives, from the pan, tilt, and zoom values representing the bird's-eye view composition read in step S1213, drive parameters for panning and tilting in desired directions at desired speeds and drive parameters for adjusting the angle of view.

In step S1215, the CPU 901 controls the drive unit 909 via the drive I/F 908 in accordance with the drive parameters derived in step S1214. This causes the drive unit 909 to drive in accordance with the parameters, and an operation to change the imaging direction of the PTZ camera 900 is performed. Further, a zoom operation is performed. After step S1215, the processing returns to step S1201 at the beginning of the loop process.

As described above, in the imaging system according to the present exemplary embodiment, the inference unit 911 is disposed in the PTZ camera 900, which leads to the realization of PTZ camera control similar to that in the first exemplary embodiment without using the edge AI device 200 according to the first exemplary embodiment described above.

In the example in the first exemplary embodiment described above, determination of whether a match is at the beginning, at the end, or underway is performed based on the longest distance between the subjects, and the switching between the tracking operation and the bird's-eye view composition is performed. In an example in a third exemplary embodiment described below, not only the longest distance between the subjects but also the shortest distance between the subjects is factored in as the distances between the subjects, which leads to more accurate determination of whether a match is at the beginning, at the end, or underway.

For example, in certain sports, only a referee is at a distance during a match. In this case, the longest distance between the subjects may become greater than or equal to the predetermined distance even during a match, and this results in switching from the automatic tracking to the bird's-eye view composition in the first exemplary embodiment. Thus, in the present exemplary embodiment, the shortest distance between the subjects is also factored in in addition to the longest distance between the subjects, which leads to accurate determination of whether a match is at the beginning, at the end, or underway. The imaging system according to the present exemplary embodiment has a similar configuration to that illustrated in FIG. 1, and internal configurations of the apparatuses in the imaging system are similar to those illustrated in FIG. 2, and the redundant detailed descriptions are omitted. Setting up operations for the apparatuses are also similar to those in the first exemplary embodiment, and the redundant detailed descriptions are omitted. Mainly differences from the first exemplary embodiment will be described below.

In the case of the imaging system according to the present exemplary embodiment, the processes in the flowcharts in FIGS. 6A and 6B are broadly similar to those described above, except that step S606 is different in processing from the first exemplary embodiment. In the present exemplary embodiment, in step S606, the CPU 201 of the edge AI device 200 also calculates the shortest distance between the subjects in addition to the longest distance between the subjects. Then, the CPU 201 determines whether to perform automatic tracking or switch to the bird's-eye view composition in accordance with the longest and shortest distances between the subjects.

The processing performed in step S606 in FIG. 6 according to the present exemplary embodiment will be described below.

In the present exemplary embodiment, in step S606, in a case where the longest distance between the subjects within the automatic selection region is greater than or equal to the predetermined distance, the CPU 201 further determines whether the shortest distance between the subjects is less than the predetermined distance.

Figure 14:
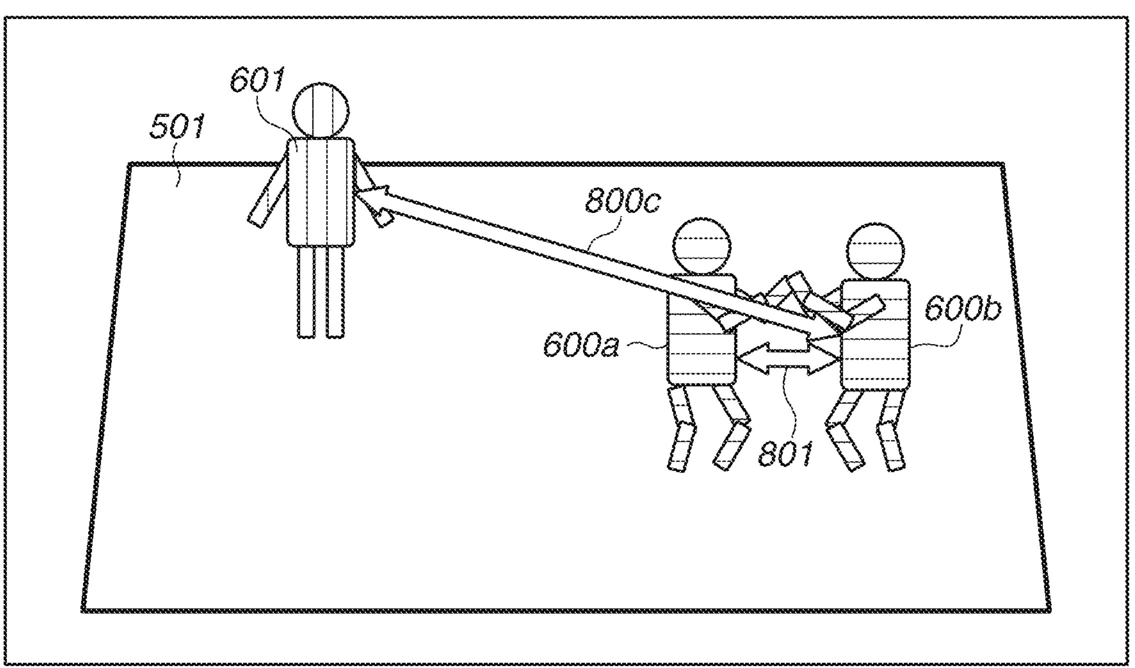
FIG. 14 is an illustrative diagram illustrating the longest distance between subjects and the shortest distance between subjects.

FIG. 14 is a diagram illustrating the longest distance between the subjects and the shortest distance between the subjects. FIG. 14 is a diagram illustrating an example of a positional relationship between the two players 600*a* and 600*b* and one referee 601 during a match as in the examples in FIGS. 8A and 8B described above. In the example in FIG. 14, a long two direction arrow indicates a longest distance 800*c* between the subjects, and a short two direction arrow indicates a shortest distance 801 between the subjects, among the distances between the subjects that are calculated based on the two players 600*a* and 600*b* and one referee 601. In the first exemplary embodiment described above, determination of whether a match is at the beginning, at the end, or underway is performed only based on the longest distance 800*b* between the subjects illustrated as an example in FIG. 8B. On the other hand, according to the present exemplary embodiment, the shortest distance 801 between the subjects is also used as a criteria for the determination in addition to the longest distance 800*c* between the subjects, as illustrated in FIG. 14.

In the present exemplary embodiment, the CPU 201 calculates the longest distance 800*c* between the subjects and the shortest distance 801 between the subjects. Then, the CPU 201 determines whether the longest distance 800*c* between the subjects is greater than or equal to the predetermined distance, and in a case where the longest distance 800*c* between the subjects is greater than or equal to the predetermined distance, the CPU 201 further determines whether the shortest distance 801 between the subjects is greater than or equal to the predetermined distance. The predetermined distance used herein as a comparison reference with the distances between the subjects may be the same distance threshold as in the first exemplary embodiment described above.

In step S606, the CPU 201 determines whether the longest distance 800*c* between the subjects is greater than or equal to the predetermined distance, and in a case where the longest distance 800*c* between the subjects is not greater than or equal to the predetermined distance (i.e., less than the predetermined distance) (NO in step S606), the processing proceeds to step S607. In a case where the longest distance 800*c* between the subjects is greater than or equal to the predetermined distance (YES in step S606), the CPU 201 further determines whether the shortest distance 801 between the subjects is greater than or equal to the predetermined distance. In a case where the longest distance 800*c* between the subjects is greater than or equal to the predetermined distance but the shortest distance 801 between the subjects is less than the predetermined distance (NO in step S606), the processing proceeds to step S607. Specifically, in a case where the shortest distance 801 between the subjects is less than the predetermined distance, the players are considered to be engaged in a match against each other, and thus the processing proceeds to the automatic tracking process from step S607. On the other hand, in a case where the longest distance 800*c* between the subjects is greater than or equal to the predetermined distance and the shortest distance 801 between the subjects is also greater than or equal to the predetermined distance, the processing proceeds to the process from step S612 to switch to the bird's-eye view composition.

As described above, in the present exemplary embodiment, determination of whether a match is underway, at the beginning, or at the end is performed more accurately.

While, in the present exemplary embodiment, the edge AI device 200 calculates the distances between the subjects as in the first exemplary embodiment, the present exemplary embodiment is also applicable to a case where the PTZ camera 900 calculates the distances between the subjects as in the second exemplary embodiment.

While, in the first to third exemplary embodiments, the control of the tracking operation and the control of the bird's-eye view composition are switched in accordance with the distances between the subjects, the first to third exemplary embodiments are also applicable to the control to switch between a control other than the tracking operation and the bird's-eye view composition or the control to switch between a control other than the tracking operation and a composition other than the bird's-eye view composition. Further, while, in the first to third exemplary embodiments, the two controls that are the tracking operation and the bird's-eye view composition are switched in accordance with the distances between the subjects, the first to third exemplary embodiments are also applicable to a case where three or more controls are switched in accordance with the distances between the subjects.

The present disclosure may be realized by a process in which a program for realizing one or more functions of the above-described exemplary embodiments is supplied to a system or an apparatus through a network or a storage medium, and the program is read and executed by one or more processors in a computer of the system or the apparatus, or by a circuit [for example, an application specific integrated circuit (ASIC)] for realizing one or more functions. The above-described exemplary embodiments are merely examples of specific embodiments for carrying out the present disclosure, and the technical scope of the present disclosure should not be construed as being limited by them. That is, the present disclosure may be carried out in various forms without departing from the technical idea thereof or the main features thereof.

The present disclosure leads to the achievement of reduction in inconvenience to operators.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-138128, filed Aug. 28, 2023, and No. 2024-078674, filed May 14, 2024, which are hereby incorporated by reference herein in their entirety.

What is claimed is:

1. An imaging control apparatus comprising:

one or more memories storing computer executable instructions; and one or more processors executing the stored instructions to:

detect a subject from an image captured by an imaging apparatus;

acquire a distance between a plurality of detected subjects;

select one of a first control over the imaging apparatus and a second control different from the first control over the imaging apparatus, based on the acquired distance; and control the imaging apparatus with the selected control, wherein the first control is a control to set an imaging direction of the imaging apparatus based on a position of the detected subject so that the subject is tracked, and wherein the second control is a control to set the imaging direction of the imaging apparatus to a predetermined direction and is selected in a case where a longest distance between the plurality of detected subjects is greater than or equal to a predetermined distance.

2. The imaging control apparatus according to claim 1, wherein the first control is selected in a case where the longest distance between the plurality of detected subjects is less than the predetermined distance.

3. The imaging control apparatus according to claim 1, wherein the second control is selected in a case where a shortest distance between the plurality of subjects is also greater than or equal to the predetermined distance.

4. The imaging control apparatus according to claim 1, wherein the one or more processors further execute the stored instructions to determine whether the detected subject is within a predetermined target region of the image, and wherein a distance between a plurality of subjects within the predetermined target region of the image is acquired.

5. The imaging control apparatus according to claim 4, wherein in a case where a number of subjects within the predetermined target region is a predetermined number, a distance between all subjects within the predetermined target region is acquired.

6. The imaging control apparatus according to claim 5, wherein the predetermined number is three.

7. The imaging control apparatus according to claim 4, wherein the first control is selectable in a case where the number of subjects within the predetermined target region is a predetermined number.

8. The imaging control apparatus according to claim 4, wherein the one or more processors further execute the stored instructions to stop the first control in a case where, after a start of the first control, the number of subjects within the predetermined target region becomes less than a predetermined number.

9. The imaging control apparatus according to claim 4, wherein the one or more processors further execute the stored instructions to, after a start of the first control, fix an imaging direction and an angle of view of the imaging apparatus to an imaging direction and an angle of view for a case where the number of subjects within the predetermined target region becomes less than a predetermined number.

10. The imaging control apparatus according to claim 4, wherein the subject is detected as a rectangular region, and wherein, in a case where a lower side of the detected rectangular region of the subject is within the predetermined target region, it is determined that the subject is within the predetermined target region.

11. The imaging control apparatus according to claim 4, wherein the one or more processors further execute the stored instructions to set the predetermined target region with respect to the image.

12. The imaging control apparatus according to claim 11, wherein the predetermined target region is set based on an instruction from a user.

13. The imaging control apparatus according to claim 11, wherein a specific region is detected from the image and the detected specific region is set as the predetermined target region.

14. The imaging control apparatus according to claim 4, wherein one or more parts of the subject is detected, and wherein, in a case where at least one of the one or more detected parts of the subject is within the predetermined target region, it is determined that the subject is within the predetermined target region.

15. The imaging control apparatus according to claim 1, wherein the one or more processors further execute the stored instructions to convert at least one of a pan value, a tilt value, and a zoom value of the imaging apparatus into a polar coordinate with a position of the imaging apparatus as an origin, and determine that the detected subject is within the predetermined target region represented by the polar coordinate.

16. The imaging control apparatus according to claim 1, wherein the imaging apparatus is controlled with the first control so that a center of gravity of two or more of the subjects is at a predetermined position in the image.

17. The imaging control apparatus according to claim 1, wherein the subject is a human figure.

18. An imaging control method comprising:

detecting a subject from an image captured by an imaging apparatus;

acquiring a distance between a plurality of detected subjects;

selecting one of a first control over the imaging apparatus and a second control different from the first control over the imaging apparatus, based on the acquired distance, and controlling the imaging apparatus with the selected control, wherein the first control is a control to set an imaging direction of the imaging apparatus on basis of a position of the detected subject so that the subject is tracked, and wherein the second control is a control to set the imaging direction of the imaging apparatus to a predetermined direction and is selected in a case where a longest distance between the plurality of detected subjects is greater than or equal to a predetermined distance.

19. A non-transitory computer-readable storage medium storing computer executable instructions that when executed by a computer cause the computer to:

detect a subject from an image captured by an imaging apparatus;

acquire a distance between a plurality of detected subjects; and select one of a first control over an imaging apparatus and a second control different from the first control over the imaging apparatus, based on the acquired distance between the subjects; and control the imaging apparatus with the selected control, wherein the first control is a control to set an imaging direction of the imaging apparatus based on a position of the detected subject so that the subject is tracked, and wherein the second control is a control to set the imaging direction of the imaging apparatus to a predetermined direction and is selected in a case where a longest distance between the plurality of detected subjects is greater than or equal to a predetermined distance.

* * * * *